July 12, 1966 H. C. LOCKLAR ET AL 3,260,340

REVISION SYSTEM FOR DATA RECORDING AND PRINTING APPARATUS

Filed June 25, 1964 11 Sheets-Sheet 1

INVENTORS.
HENRY C. LOCKLAR
DONALD E. SIMS

BY D. Kendall Cooper
ATTORNEY.

July 12, 1966 H. C. LOCKLAR ET AL 3,260,340

REVISION SYSTEM FOR DATA RECORDING AND PRINTING APPARATUS

Filed June 25, 1964 11 Sheets-Sheet 4

July 12, 1966 H. C. LOCKLAR ET AL 3,260,340

REVISION SYSTEM FOR DATA RECORDING AND PRINTING APPARATUS

Filed June 25, 1964 11 Sheets-Sheet 8

July 12, 1966 H. C. LOCKLAR ET AL 3,260,340

REVISION SYSTEM FOR DATA RECORDING AND PRINTING APPARATUS

Filed June 25, 1964 11 Sheets-Sheet 10

July 12, 1966 H. C. LOCKLAR ET AL 3,260,340

REVISION SYSTEM FOR DATA RECORDING AND PRINTING APPARATUS

Filed June 25, 1964 11 Sheets-Sheet 11

United States Patent Office
3,260,340
Patented July 12, 1966

3,260,340
REVISION SYSTEM FOR DATA RECORDING AND PRINTING APPARATUS

Henry C. Locklar and Donald E. Sims, Lexington, Ky., assignors to International Business Machines Corporation, New York, N.Y., a corporation of New York Filed June 25, 1964, Ser. No. 377,850
23 Claims. (Cl. 197—19)

This invention relates to data recording and printing apparatus and more particularly to apparatus of this nature which has provision for revising originally prepared lines of information.

The invention is disclosed in connection with a digital magnetic tape recording and reproducing unit that is interconnected with a single head printer for input and output purposes. During the preparation of a document on the printer, the functional and informational characters encountered are recorded on the magnetic tape concurrently with the preparation of the document. Subsequently, the magnetic tape unit is conditioned for an automatic mode of operation wherein the characters previously recorded are read and supplied to the printer in order to prepare as many additional documents as may be required for the particular application.

During the initial printing and recording of information, it frequently happens that errors, omissions, or duplications may have occurred. Data characters are normally recorded in relatively long uninterrupted sequence on a magnetic tape so that during the subsequent reading and printing from the magnetic tape, the originally recorded errors, omissions, or duplications cannot be easily rectified.

Therefore, an object of the invention is to facilitate correction procedures for recording and printing apparatus.

A further object of the invention is to provide for the revision of information stored in a record media.

A still further object of the invention is to simplify data revision procedures in an automatic document preparing apparatus.

An additional object of the invention is to enable the automatic high speed preparation of documents while retaining a certain amount of control for manual correction procedures by an operator.

Another object of the invention is to facilitate the location of information with respect to which corrective procedures are deemed necessary.

In accordance with a preferred embodiment of the invention, a line revision feature is provided for a data recording and printing apparatus which automatically allots extra storage space during the recording of information on a revisable record media for subsequent use during correction or expansion of the recorded information.

In order to insure an efficient operation, provision is made for locating information as to which corrective procedures are required in a rapid manner while maintaining a fine degree of operator control.

The foregoing and other objects, features and advantages will be more apparent from the following more particular description of the preferred embodiment of the invention as illustrated in the accompanying drawings.

FIG. 1 shows a typical document printed and revised according to the present invention.

FIG. 10 shows the rewind, one cycle, and skip relays.

FIG. 11 shows the cycle clutch magnet, the collector control relay, the stop relay and the hold coil of the feed relay.

FIG. 12 shows various carrier return relays and the pick coil of the feed relay.

FIG. 13 shows certain start condition circuits and line return control relays.

Figure 14:
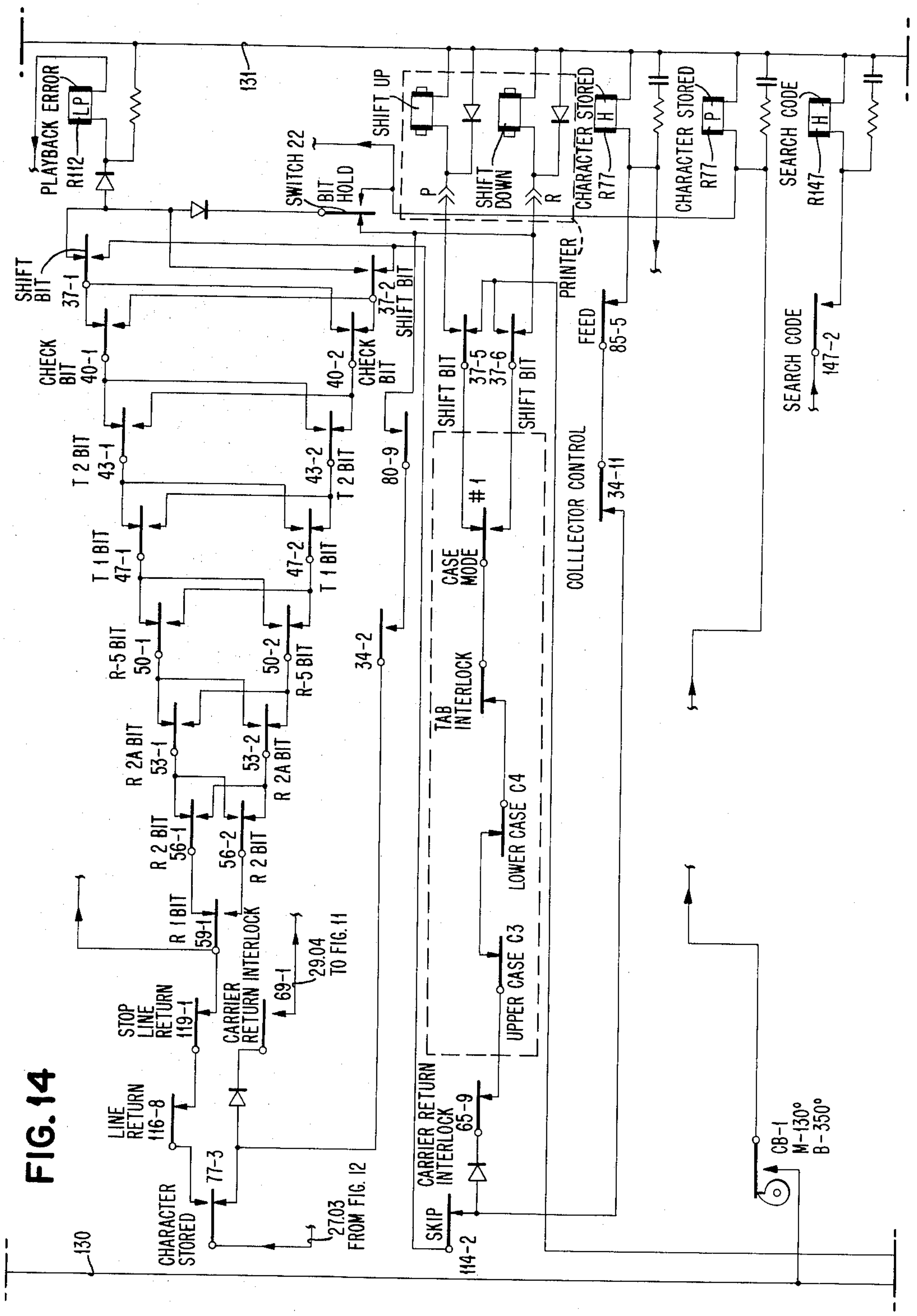

FIG. 14 includes the parity checking network with the playback error relay, the shift magnets in the printer, the character stored relay and the search code relay.

Figure 1:
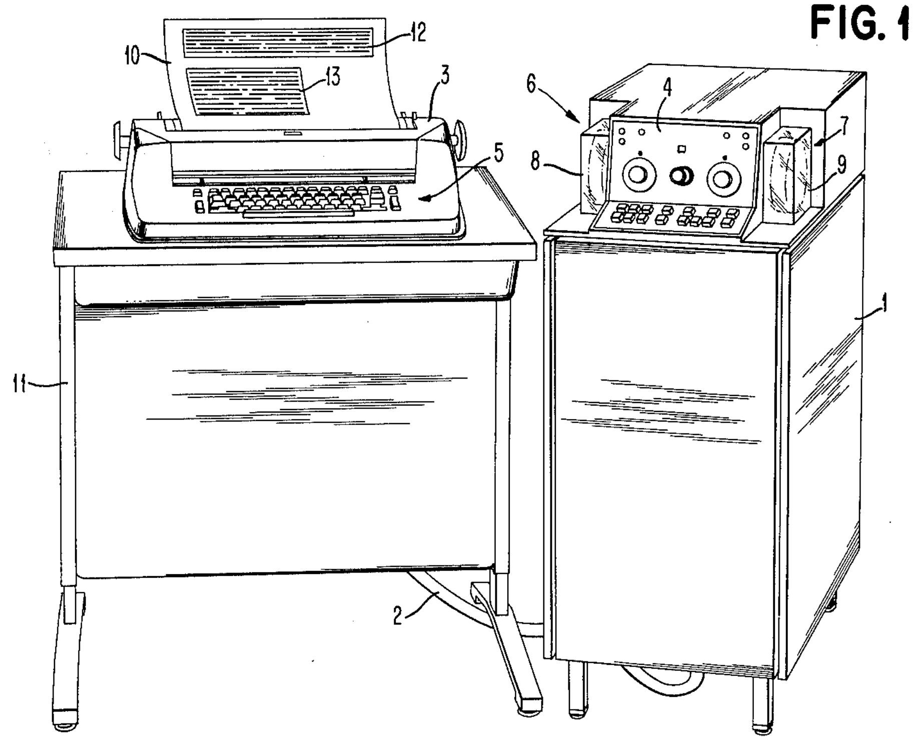
FIG. 1 is a perspective view of apparatus according to the present invention which includes a magnetic tape recording and reproducing unit that is interconnected with a printer for entry and output purposes. In addition.
Figure 15:
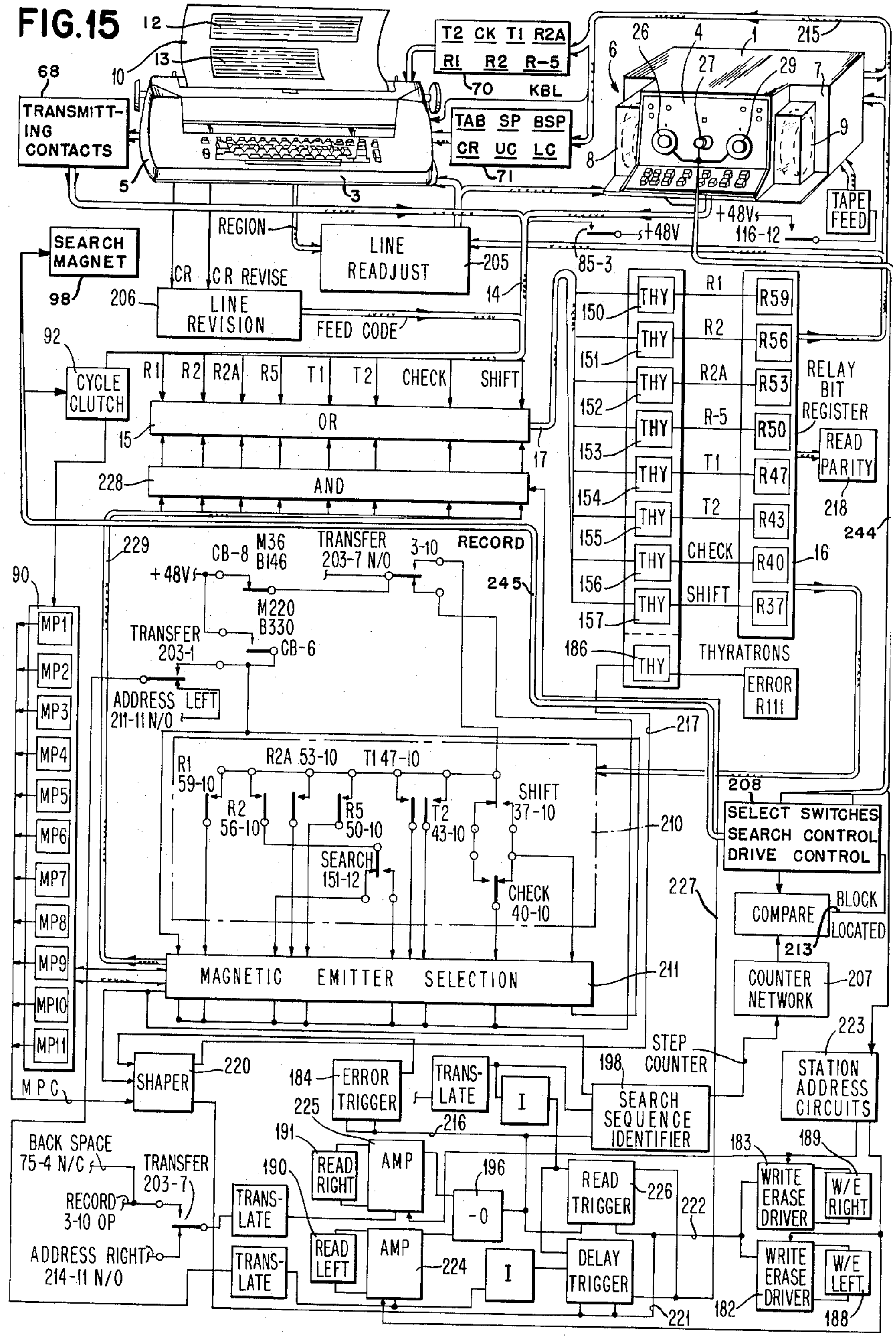

FIG. 15 is a block circuit diagram of the printing and recording apparatus of FIG. 1.

FIGS. 1 and 15 illustrate a preferred arrangement of equipment in which the invention is incorporated. The apparatus includes a recording and reproducing unit 1 that is interconnected by a cable 2 to an input/output printer 3. Tape unit 1 has a control panel 4 that is shown in greater detail in FIG. 3 while input/output printer 3 has a keyboard 5 that is shown in greater detail in FIG. 4. Tape unit 1 has a left tape station 6 and a right tape station 7. A tape cartridge 8 is positioned at left tape station 6 and a tape cartridge 9 is positioned at right tape station 7. Printer 3 has a document 10 that is considered to be under preparation. For convenience, printer 3 is mounted in a desk console 11 and would normally have an associated chair, not shown, for the use of the operator. A more detailed discussion of FIG. 15 is presented further on. Document 10 has printed areas 12 and 13 that represent typical letters or messages that may be printed.

Figure 2:
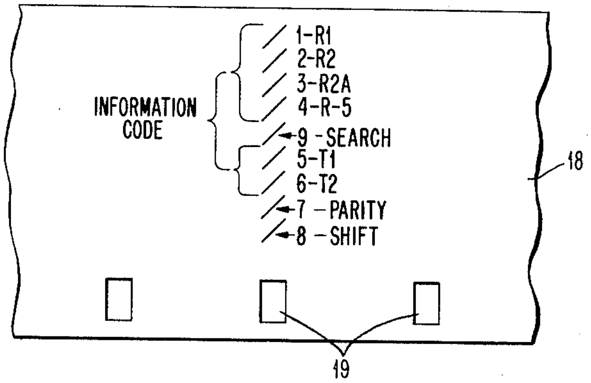
FIG. 2 represents a portion of a magnetic tape that is used in the recording and reproducing unit of FIG. 1 and further shows the data format that is used.

FIG. 2 shows a portion of a magnetic tape 18 that has sprocket holes 19 for feeding purposes in the tape unit 1. Individual characters of information and functional characters are recorded on tape 18 transversely across the tape. Nine channels are used comprising bits designated as follows:

Channel 1-Bit R1
Channel 2-Bit R2
Channel 3-Bit **R2*a***
Channel 4-Bit R–5
Channel 5-Bit T1
Channel 6-Bit T2
Channel 7-Parity (Check) Bit
Channel 8-Shift
Channel 9-Search The designations of channels and bits do not necessarily correspond with their physical location on the magnetic tape 18. The bits of information are recorded at a 45° angle as shown in FIG. 2 by means of a magnetic head having a 45° read/write gap.

The purpose of the 45° arrangement is to permit recording and reading transversely of the tape and to also permit searching in a longitudinal direction of the tape. Recording of the bits of information is performed in sequence from the top edge of the tape 18 to the lower edge, that is, from bit R1 to the Shift bit. The Search bit is recognized for locating blocks of information on the tape. The Parity bit is selectively added to each character on the tape to maintain an odd parity. The Shift bit controls whether or not the printer 3 is shifted from an upper case to a lower case or vice versa, for the character involved.

Characters of information and functional characters are recorded on tape according to the following table:

| Bit Position | 1 | 2 | 3 | 4 | 5 | 6 | | |
|---|---|---|---|---|---|---|---|---|
| | R1 | R2 | R2a | R-5 | T1 | T2 | Check* | Shift* |
| Character: | | | | | | | | |
| a | 1 | 1 | 0 | 1 | 0 | 1 | 2 | 0 |
| b | 1 | 1 | 1 | 0 | 1 | 0 | 1 | 0 |
| c | 1 | 1 | 0 | 1 | 1 | 0 | 1 | 0 |
| d | 0 | 1 | 0 | 1 | 1 | 0 | 0 | 0 |
| e | 0 | 1 | 0 | 0 | 1 | 0 | 1 | 0 |
| f | 1 | 0 | 0 | 1 | 1 | 1 | 1 | 0 |
| g | 0 | 0 | 0 | 1 | 1 | 1 | 0 | 0 |
| h | 0 | 1 | 1 | 0 | 1 | 0 | 0 | 0 |
| i | 1 | 1 | 0 | 0 | 0 | 1 | 0 | 0 |
| j | 0 | 0 | 0 | 0 | 1 | 1 | 1 | 0 |
| k | 1 | 1 | 0 | 0 | 1 | 0 | 0 | 0 |
| l | 0 | 1 | 1 | 1 | 1 | 0 | 1 | 0 |
| m | 0 | 0 | 0 | 1 | 0 | 1 | 1 | 0 |
| n | 1 | 0 | 0 | 0 | 1 | 0 | 1 | 0 |
| o | 0 | 1 | 1 | 1 | 0 | 1 | 1 | 0 |
| p | 0 | 1 | 0 | 0 | 1 | 1 | 0 | 0 |
| q | 1 | 1 | 0 | 0 | 1 | 1 | 1 | 0 |
| r | 0 | 1 | 0 | 1 | 0 | 1 | 0 | 0 |
| s | 0 | 1 | 1 | 0 | 0 | 1 | 0 | 0 |
| t | 0 | 0 | 0 | 0 | 1 | 0 | 0 | 0 |
| u | 1 | 0 | 0 | 1 | 1 | 0 | 0 | 0 |
| v | 1 | 0 | 0 | 1 | 0 | 1 | 0 | 0 |
| w | 1 | 1 | 1 | 0 | 0 | 1 | 1 | 0 |
| x | 0 | 0 | 0 | 1 | 1 | 0 | 1 | 0 |
| y | 0 | 1 | 1 | 0 | 1 | 1 | 1 | 0 |
| z | 0 | 0 | 0 | 0 | 0 | 0 | 1 | 0 |
| 1 | 0 | 0 | 0 | 1 | 0 | 0 | 0 | 0 |
| 2 | 1 | 0 | 0 | 0 | 0 | 0 | 0 | 0 |
| 3 | 1 | 0 | 0 | 1 | 0 | 0 | 1 | 0 |
| 4 | 0 | 1 | 1 | 1 | 0 | 0 | 0 | 0 |
| 5 | 0 | 1 | 0 | 0 | 0 | 0 | 0 | 0 |
| 6 | 1 | 1 | 0 | 0 | 0 | 0 | 1 | 0 |
| 7 | 0 | 1 | 0 | 1 | 0 | 0 | 1 | 0 |
| 8 | 1 | 1 | 0 | 1 | 0 | 0 | 0 | 0 |
| 9 | 1 | 1 | 1 | 0 | 0 | 0 | 0 | 0 |
| 0 | 0 | 1 | 1 | 0 | 0 | 0 | 1 | 0 |
| ; | 0 | 1 | 0 | 1 | 1 | 1 | 1 | 0 |
| , | 1 | 1 | 0 | 1 | 1 | 1 | 0 | 0 |
| . | 1 | 0 | 0 | 0 | 0 | 1 | 1 | 0 |
| : | 0 | 1 | 0 | 0 | 0 | 1 | 1 | 0 |
| ! | 0 | 0 | 0 | 0 | 0 | 1 | 0 | 0 |
| / | 0 | 1 | 1 | 1 | 1 | 1 | 0 | 0 |
| = | 1 | 0 | 0 | 0 | 1 | 1 | 0 | 0 |
| - | 1 | 1 | 1 | 0 | 1 | 1 | 0 | 0 |
| Carrier Return | 0 | 0 | 1 | 0 | 0 | 0 | 0 | 0 |
| Tab | 0 | 0 | 1 | 0 | 0 | 1 | 1 | 0 |
| Space | 0 | 0 | 1 | 0 | 1 | 1 | 0 | 0 |
| Backspace | 0 | 0 | 1 | 1 | 0 | 1 | 0 | 0 |
| Stop | 1 | 0 | 1 | 1 | 0 | 0 | 0 | 0 |
| Feed | 1 | 0 | 1 | 1 | 0 | 0 | 0 | 0 |
| Auto Search | 1 | 0 | 1 | 0 | 0 | 1 | 0 | 0 |
| Switch | 1 | 0 | 1 | 0 | 0 | 0 | 1 | 0 |
| Stop Transfer | 1 | 0 | 1 | 1 | 1 | 1 | 0 | 0 |

*For upper case characters, a shift bit is added in every case and the check bit is added or deleted to maintain odd parity, for example as follows:

a is 11010110 g is 00011100
A is 11010101 G is 00011111

Certain characters or functions are performed under control of a single bit recorded on the tape as follows:

R1-1 bit-Encode 2
R2-2bit-Encode 5
**R2*a*-3** bit-Encode Carrier Return (CR)
R-5-4 bit-Encode Bracket
T1-5 bit-Encode *t*
T2-6 bit-Encode !
Ck-7 bit-Encode z
Sft-8 bit-Encode Z The printer responds to character signals derived during tape playback representing printer characters, such as Carrier Return, Tab, etc. The tape unit responds to character signals representing non-printer characters, such as Fed and Auto Search.

Figure 3:
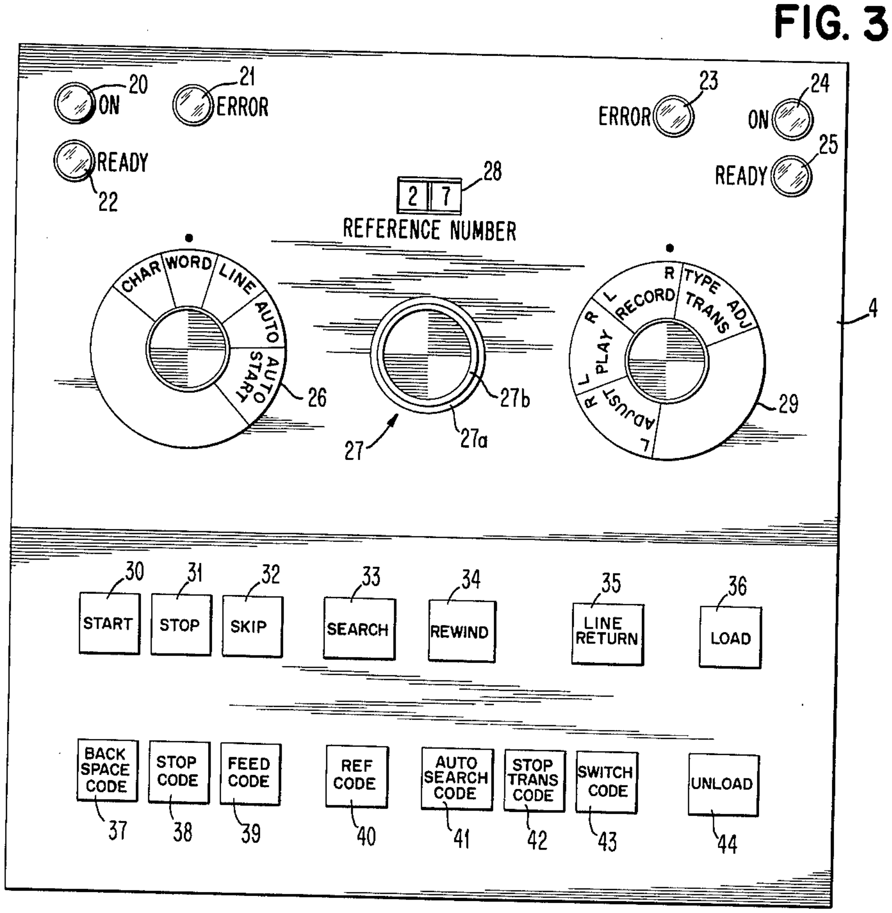
FIG. 3 is a detailed view of the control panel on the magnetic tape recording and reproducing unit of FIG. 1.

Referring now to FIG. 3, control panel 4 is shown in greater detail. Left tape station 6 has an associated On lamp 20, an Error lamp 21, and a Ready lamp 22; and right tape station 7 has an Error lamp 23, an On lamp 24, and a Ready lamp 25 associated therewith. One or the other of On lamps 20 or 24 will be on at all times depending upon which tape station 6 or 7 is addressed. Ready lamps 22 and 25 are on when the associated tape station is ready for recording or for some other type of operation. Error lamps 21 and 23 indicate erors in characters during recording or playback.

Below the lamps for the left hand tape station is positioned a Start Condition knob 26 which has five positions designated Character, Word, Line, Automatic (Auto), and Automatic (Auto) Start. Start Condition knob 26 controls the selection of progressively variable length units of data for reading and printing. When in the Character position, each depression of the Start button 30 or Skip button 32 results in the playback of one character of information. When in the Word position, individual words of information are recognized and played back in their entirety with the Space or Carrier Return following the word resulting in a machine stop condition. The Line position on knob 26 results in an entire line being played back on the equipment and a Carrier Return code results in the machine stop condition. When in the Automatic position, the equipment will play back continuously until a Stop code or stop condition is recognized. The Auto Start position enables the equipment to start automatically following a Search operation.

In the center of the control panel 4 is a Reference selection knob 27 comprising a units knob **27*a* and a tens knob 27*b* that are used by the operator to select a particular block of information indicated by a reference number shown in a window 28**. As an example, information block "27" is shown in FIG. 3 as having been selected.

Positioned to the right on the control panel 4 is a Mode selector dial or knob 29 which has the following positions:

Adjust Left
Adjust Right
Play Left
Play Right
Record Left
Record Right
Transfer with Type (Trans. Type)
Transfer Adjust (Trans. Adj.)

The left and right designations on dial 29 correspond respectively to the left and right tape stations 6 and 7. Recording on one or the other tapes is set up by positioning dial 29 to either the Left or Right Record position. Playing back of information for printing on printer 3, FIG. 1, is controlled by positioning dial 29 into either the Left or Right Playback (Play) position. The Left or Right Adjust position on dial 29 is used during the performance of the Line Readjustment operation which is the subject of copending application Ser. No. 377,897, filed June 25, 1964, with D. E. Sims as inventor, entitled, "Data Recording and Printing Apparatus," and having the same assignee as the present application. Information can be transferred from the right tape station to the left tape station with concurrent printing on printer 3 by positioning dial 29 so that the Transfer Type mode is selected. Concurrent transfer of information from the right tape station to the left tape station together with readjustment of the information on document 10 in printer 3 takes place when dial 29 is set to Transfer Adjust. A number of other control buttons are also furnished on control panel 4:

Start Button 30 is provided for starting machine operation.

Stop Button 31 is operated to stop the machine during any operation.

Skip Button 32 will effect the skipping of information during playback without printing on printer 3.

Search Button 33 is used for initiating a search for the block of information designated by knob 27 and shown in window 28.

Depression of the Rewind button 34 will result in a rewinding of the tape at the station that is presently addressed.

The Line Return button 35 initiates a stepping operation when the tape is read in a backward direction until the first encountered Carrier Return code is found.

A tape at either station is loaded under control of the Load button 36.

The lower rows of buttons on control panel 4 comprise the following:

Backspace code button 37 enables the recording of a Backspace code on the tape.

Stop code button 38 enables the recording of a Stop code for stopping the machine during tape reading.

Feed code button 39 causes the recording of a Feed code which will result in the tape unit automatically stepping one character space on the tape.

Depression of the Reference code button 40 results in the automatic recording of 51 individual codes in sequence on the tape at the station addressed for later recognition during block searching. The codes are arranged in such a manner that the tape can be properly accelerated and decelerated in between blocks of information on the tape.

The first fifteen codes are Auto Search codes which are recognized as such on a machine having the Search feature, but which are recognized as Rewind codes on a machine not having this Search feature. The second fifteen codes that are recorded automatically by depression of the Reference code button 50 are the Search bits which are in the center channel on tape 18 in FIG. 2. These bits are integrated and recognized for locating the block of information required. The next twenty codes that are automatically recorded are Parity codes which are used only for deceleration of the tape. The fifty-first code that is automatically recorded is a Carrier Return code. So long as the machine encounters any of the parity codes during or in the reference interval on the tape it will continue to cycle until it reaches and recognizes the Carrier Return code at which time it will come to an automatic stop in preparation for acting on the first character of information or functional character encountered in the block of information selected.

Auto Search code button 41 is provided to permit the recording of an Automatic Search code in the tape to direct the machine to locate a selected block of information whenever the code is encountered during the course of reading the tape. This code may be used for repetitive location of the same block of information.

Stop Transfer code button 42 is depressed to record a Stop Transfer code that will stop the transfer of information from the right tape to the left tape.

The depression of the Switch code button 43 will result in the recording of a Switch code on the tape at the station addressed which can subsequently be recognized for switching from that tape to the other tape during a Playback or Adjust operation.

The Unload button 44 is provided to permit unloading of the tape at the station addressed. Unloading will occur so long as the button is held depressed or until completed.

*Printer*

Figure 4:
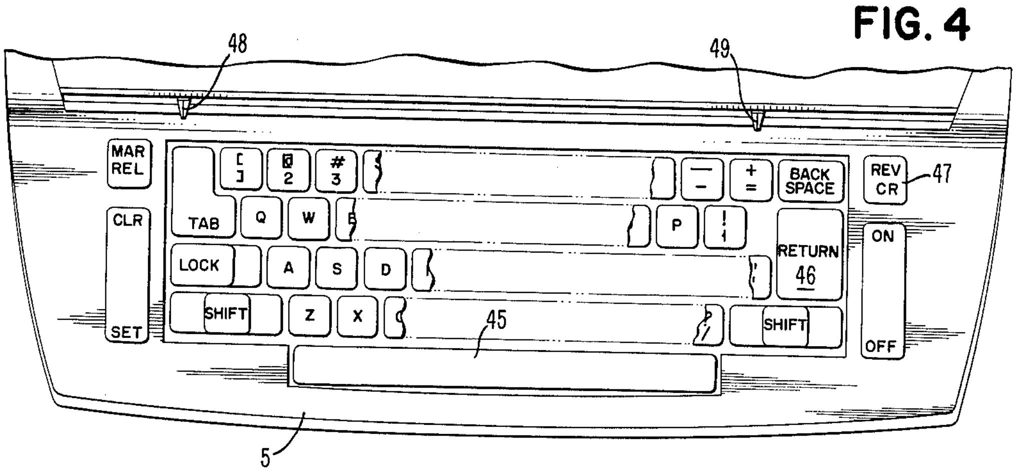
FIG. 4 is a detailed partial view of the keyboard on the printer in the apparatus of FIG. 1.

FIG. 4 shows the keyboard 5 that is provided for printer 3, FIG. 1. All informational characters and functional characters normally supplied with an electric input/output printer are furnished on the keyboard as shown. Only so much of the keys are shown in detail as are deemed necessary to permit the keyboard to be understood.

The printer is generally of the type disclosed in U.S. Patent 2,919,002, L. E. Palmer, Selection Mechanism for a Single Printing Element Typewriter as modified for input/output operation in U.S. Patent 3,082,854, F. E. Becker et al., Typewriter Input Checking Mechanism.

The Palmer patent describes a machine which has a single element printing head wherein all the characters of a type font are located on the surface of the single head. The head is mounted on a carrier for movement in a path adjacent to and in parallel relation with the platen which remains stationary, except for line spacing operations.

A character is selected by tilting and rotating the single element printing head in response to depression of one of a plurality of keylevers, each keylever being assigned to a character on the printing head. The keylever selectively actuate a displacement mechanism having two principal portions, one for tilting and another for rotating the printing head. More specifically, selecting links are operated which determine the pivot points of connecting members to produce an output of predetermined displacement and direction. In each portion of the displacement mechanism, the value of the output is determined by the links selected either singly or in combination. When the links are selected in combination, the displacement is the sum of the individual displacements of the links. A tape and pulley mechanism couple the displacement mechanism to the printing head to locate the selected character in a reference position. Thereafter, the head is caused to strike the platen to print the chosen character.

Bar 45, when depressed, results in a spacing operation. Whenever function button 46 designated "Return" is depressed, a Carrier Return operation will be performed by the printer. During certain correction procedures another button 47 designated "Revise Carrier Return (Rev. C.R.)" is depressed instead of the normal Carrier Return button 46. The printer keyboard 5 shown in FIG. 4 also shows a left margin set lever 48 and a right margin set lever 49.

The printer 3 is further modified for particular use with the Magnetic Tape recording and reproducing unit 1. The normal printer features together with the modifications necessary for use with the tape apparatus can be observed by reference to FIGS. 5 and 6. The printer has a single element print head 50 that is mounted on a carrier 51 for movement adjacent a platen 52. The print head is normally returned to the extreme left as determined by the margin set lever 48. As typing proceeds, the carrier 51 is spaced or tabulated to the right until the right margin set lever 49 is encountered.

Considering other aspects of printer 3 and with reference again to the FIGS. 5 and 6, depression of a character key on keyboard 5 causes movement of an associated one of the interposers 62 to the rear of the printer. The exact details of hardware and operation in the printer are not fully disclosed herein since they are covered in the aforementioned Palmer and Becker patents. However, movement of an interposer 62 to the rear effects movement of selector bails 63 in various combinations depending upon the interposer that has been moved. Movement of any interposer 62 also effects movement of a cycle bail 64 which, through various linkages 65, effects release of a cycle clutch, not shown, and subsequent rotation of a filter shaft 66.

Depending on the interposer that was moved to the rear of the machine, various combinations of the selector bails 63 will be moved toward the front of the machine. Movement of five of the selector bails 63 will result in a like movement to the front of the machine of associated latch interposers 67. The latch interposers are utilized for rotating and tilting the print head 50 in order to effect selection of a particular character corresponding to the key depressed. Movement of the latch interposers also results in closure of various transmitting contacts 68 and code check contacts 69. The transmitting contacts 68 are used to supply signals to tape unit 1 indicating the character that was selected for recording purposes. The code check contacts 69 are used for checking proper selection.

During output, seven selector magnets, generally indicated at 70, control the rotating and tilting of the print head 50 for printing purposes. The seven magnets are designated T2, Check (CK), T1, R2*a*, R1, R2, and R-5, which correspond to the various bit positions noted in the code chart previously given and which also correspond to the two tilt selection situations and the four rotate situations for positioning the print head 50. An operational selection unit 71 includes magnets for functional operations and associated contacts. Printer functions include Tab, Space (SP), Back-space (BSP), Carrier Return (CR), and Revise Carrier Return (RCR). Initiation of functions during input operations to the tape unit is performed under control of interposers that are associated with the function keys on keyboard 5. Conversely, initiation of functions required during output operations, when one of the magnetic tapes is being played back, is under control of the operation select or magnets. A keyboard lock (KBL) solenoid 72 prevents operation of the keys during output operations and under certain other interlock conditions.

Figure 12:
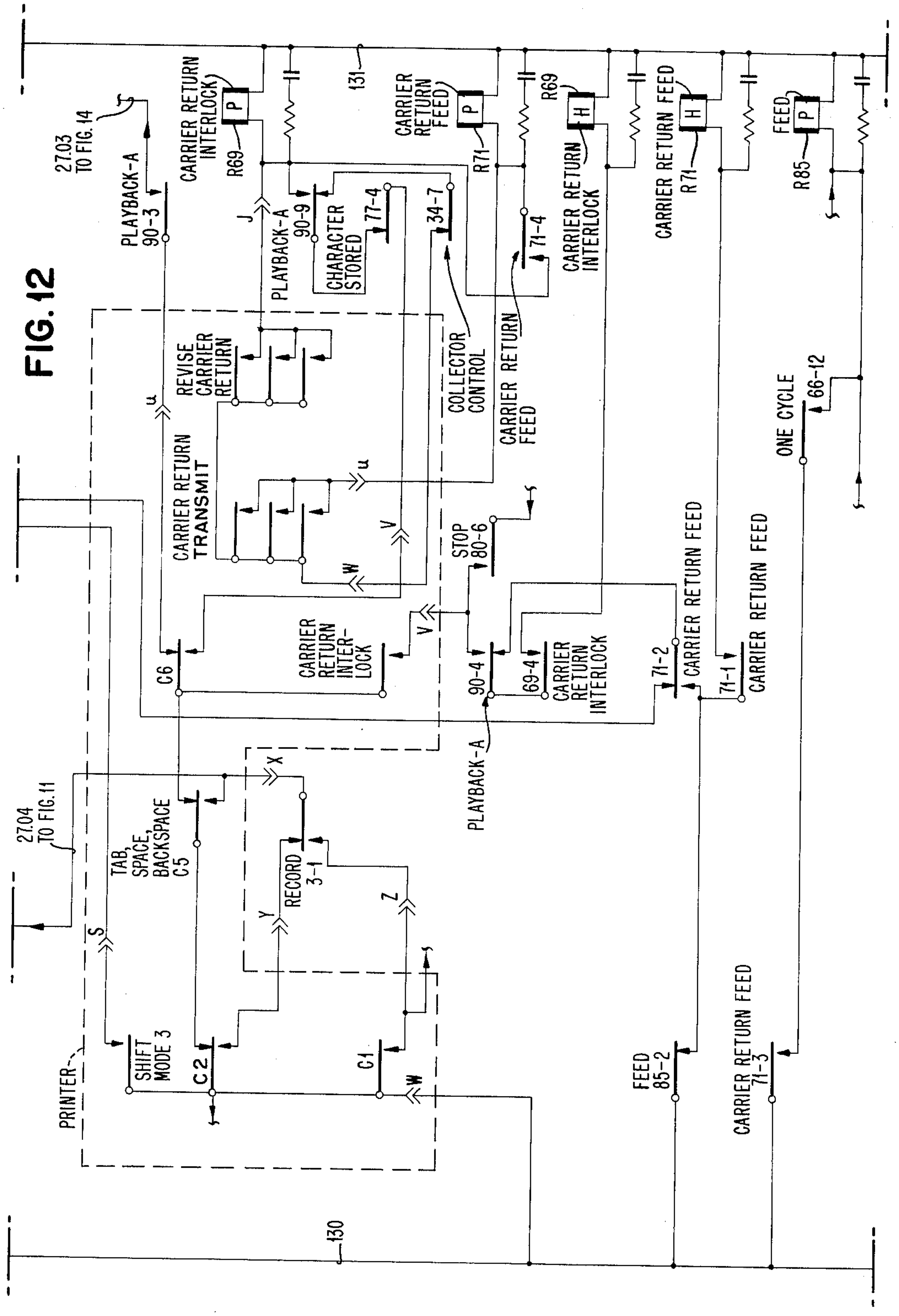

Various contacts are provided in printer 3. These contacts include the C1 Print Transmitting contacts and the C2 Print Feedback contacts shown in FIG. 12 and the C3 Upper Case (UC) and C4 Lower Case (LC) contacts shown in FIG. 14. The Tab, Space and Backspace operations result in the closure of a C5 contact, while a Carrier Return or a Revise Carrier Return results in closure of a C6 contact. The C5 and C6 contacts are shown in FIG. 12. Other contacts provided include the Carrier Return interlock contacts 76 in FIG. 12 and the Tab interlock contacts 77 in FIG. 14.

*Tape Unit*

The apparatus of FIGS. 1 and 15, including tape unit 1, is somewhat similar to that disclosed in U.S. Patent 3,115,620 to L. M. Cooper and D. E. Sims, in that a typewriter printer is used for entry and printing in connection with a magnetic tape unit. In the Cooper, et al. patent, provision is made for sweeping a magnetic head transversely across the tape to record the characters of information and functional characters during entry procedures from the typewriter. Subsequently, the characters recorded on the tape can be used for preparing additional documents on the typewriter.

However, the system arrangement of the present apparatus represents an improvement over that disclosed in the Cooper et al. patent. In the present apparatus, for example, two tape stations are provided, that is the left tape station 6, and the right tape station 7. This permits an intermixing of data during entry procedures from the keyboard to the tape 8 at tape station 6, as well as from the tape 9 at tape station 7. In addition, provision is made in the present apparatus for searching for individual blocks of information for purposes of alteration or for print out purposes.

A consideration of the mechanical aspects of the tape unit 1 will first be made in connection with FIG. 7, which is a top elevation of tape unit 1.

Figure 7:
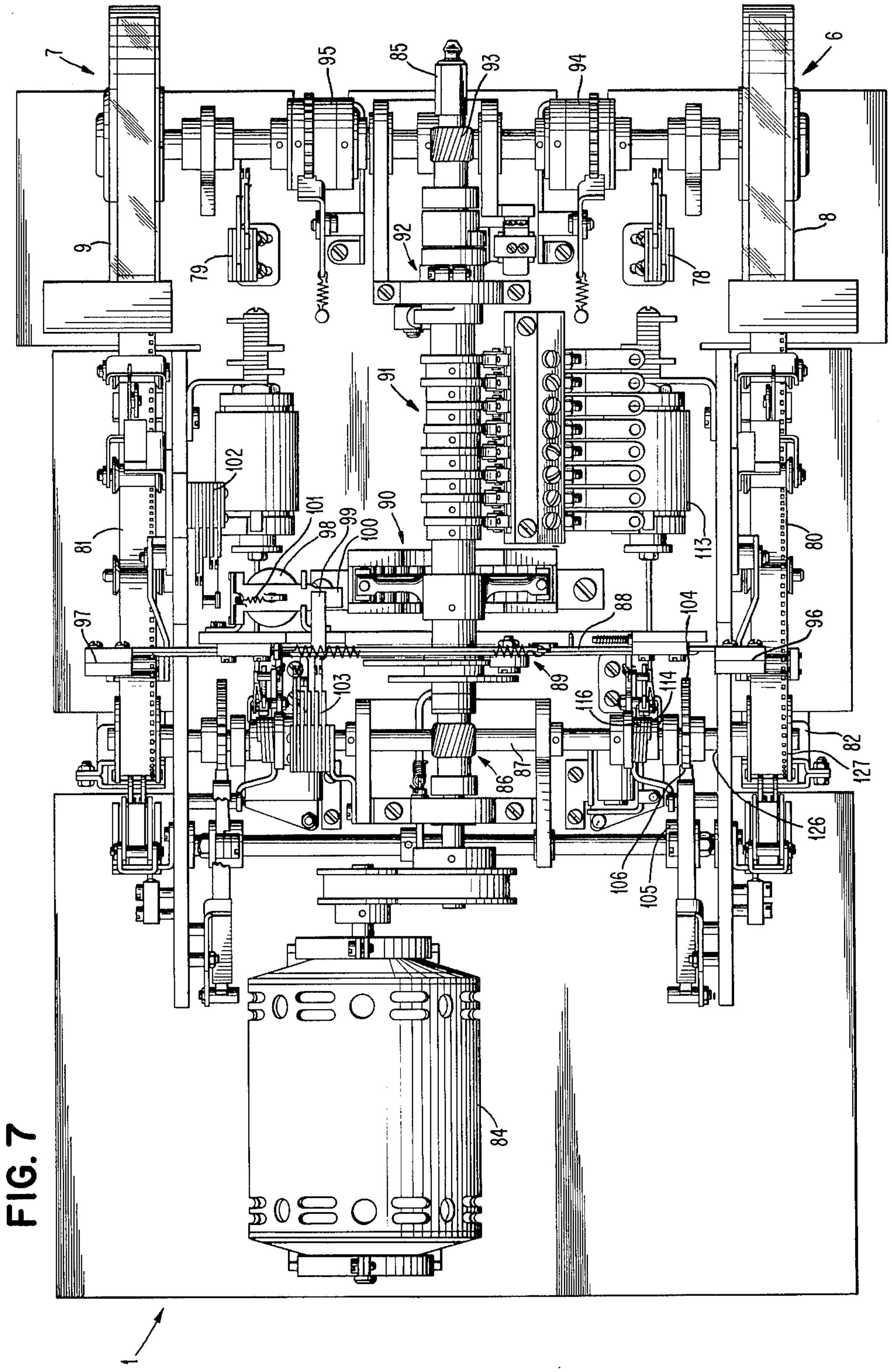
FIG. 7 is a top elevation of the magnetic tape recording and reproducing unit of FIG. 1 with the cover removed.

Referring to FIG. 7, the right and left tape stations are indicated with reference numerals that correspond to those used in FIG. 1. Tape stations 6 and 7 and the related tape cartridges 8 and 9 are located in the right portion of FIG. 7 which represents the front of tape unit 1. Switches 78 and 79 are provided to indicate that the respective cartridge 8 or 9 is properly positioned for loading or unloading the tape. A magnetic tape 80 is indicated as being fed through the left tape processing facilities of tape unit 1 in both FIGS. 9 and 10. Another magnetic tape 81 is indicated as being fed from tape cartridge 9 through the right hand station processing facilities in tape unit 1. Each tape station includes a bin, such as bin 82, for accumulating magnetic tape as it feeds into the apparatus.

Loading of tape, such as tape 80, from cartridge 8 into bin 82 occurs in connection with a leader, not shown, in a manner that is disclosed in copending application Serial No. 165,387, now Patent No. 3,153,516, with R. M. DeLoof and L. M. Cooper as inventors, filed January 10, 1962, and entitled, Tape Handling Mechanism. Tape 81 is loaded and fed in a manner similar to the loading and feeding of tape 80. Loading is performed under control of the load button 36, FIG. 3, and will be effected for whichever tape station is currently addressed by the Mode Selector dial 29. Unloading operations are under control of the unload button 44, FIG. 3.

Referring again to FIG. 7, tape unit 1 has a motor 84 that drives a drive shaft 85 that extends generally from the rear to the front of tape unit 1. Gears 86 and associated shaft 87 are provided for operating certain searching and stepping mechanisms at each station. Certain drive cams and mechanisms for driving a magnetic head slide 88 are indicated at 89. A magnetic emitter 90 is driven from shaft 85 and provides certain clocking impulses during operation of the apparatus. A set of circuit breakers, eight in number, are indicated at 91. A cycle clutch gear associated mechanism is indicated at 92. Another gear 93 is supplied near the end of shaft 85 for driving a pair of two-torque clutches 94 and 95 that are associated with tape stations 6 and 7 for establishing bias and rewind torque conditions with respect to the tapes 80 and 81. The two-torque clutches 94 and 95 can take a number of forms but as an example, clutches of this type are disclosed in U.S. Patent 3,104,745 to W. J. Wipke, issued September 24, 1963, entitled, "Two-Torque Spring Slip Clutch"; and also application Serial No. 223,657, filed September 14, 1962, now U.S. Patent 3,197,002, with L. M. Cooper as inventor, entitled, "Two Torque Clutch." The rewind and bias conditions encountered during operation of the equipment are discussed in the aforementioned DeLoof et alq., patent. Basically during a forward transport of either tape 80 or 81 through the equipment, a low torque is maintained by clutches 94 and 95 to prevent festooning or overrunning of the tape. When it is required that either tape 80 or 81 be withdrawn from the apparatus and unloaded back into its associated cartridge 8 or 9, then a high torque level is established in clutch mechanisms 94 and 95 for this purpose.

Recording and reading of characters on either tape 80 or 81 is performed by reciprocating head slide 88 so that magnetic heads 96 and 97 are moved transversely across their associated tapes 80 and 81. As mentioned in connection with FIG. 2, recording of bits of information is performed at a 45° angle with respect to the direction of movement of the heads 96 and 97. This is utilized during a high speed search operation for locating blocks of information on either tape 80 or 81 since the 45° bit positions can be read either transversely of the tape or longitudinally.

Stepping of tape 80 or 81 occurs under control of a stepping ratchet, such as ratchet 104, that in turn is stepped in either a forward direction or a backward direction under control of a lever 105 and two associated fingers, such as finger 106. The fingers are brought into operating position under control of a back stepping magnet and a forward stepping magnet. An individual tape 80 or 81 is maintained in an accurate position by means of a detent, not shown. Under certain conditions, such as high speed Search and Rewind, the detent is disengaged from the ratchet under control of a detent solenoid 113. At the same time that this takes place, a shoe 114 is brought into contact with a clutch spring 116 to change the driving relationship of the clutching mechanism and to effect the high speed forward movement of the tape involved.

Ratchet 104 is connected to a shaft 126 mounting a sprocket wheel 127 that is in actual physical engagement with tape 80 for driving the same under control of sprocket holes such as sprocket holes 19, FIG. 2. Tape 81 is driven in a similar manner.

*System description*

Reference is made to the block circuit diagram of FIG. 15. Tape unit 1 and printer 3 are illustrated in a manner similar to that in FIG. 1. Control panel 4 and keyboard 5 are also shown. The diagram of FIG. 15 includes a number of areas involved in the recording and reading of information. In order to record information, the data path generally is as follows. Informational and functional characters are entered from control panel 4 or keyboard 5. Signals representative of the characters are applied by a cable 14 to an Or network 15. The outputs of the Or network are supplied by cable 17 to condition thyratrons 150–157 in order to energize relays R59–R37 in the relay bit register 16. The relays R59–R37 are energized in a configuration that represents the particular character involved. Certain of the relay points of relays R59–R37 are included in an encoding block 210 for determining selection of bits to be recorded under control of a Magnetic Emitter Selection block 211. The depression of one of the encoding buttons on panel 4 or one of the key buttons on keyboard 5 will also result in the energization of the cycle clutch 92 and the subsequent cycling of the tape unit drive. During the cycling of the tape unit, a series of clock pulses designated MP1–MP11 are made available from the magnetic emitter 90 in a selective manner over a Magnetic Pickup Common line (MPC). The magnetic emitter 90 operates in synchronism with the movement of the heads across their associated tapes. The Magnetic Emitter Selection block 211 will control the magnetic emitter 90 in such a fashion that a series of bits representative of the character to be recorded is made available in sequence on the Magnetic Pickup Common line to a shaper 220. From shaper 220, the pulses are transferred over line 221 and line 222 to either Write/Erase driver 182 or Write/Erase driver 183. The drivers 182 and 183 have record or Write/Erase (W/E) coils 188 and 189, respectively associated therewith. The determination as to which driver and head combination is selected is under control of the Station Address circuits 223.

In order to playback (read) information that was previously recorded on one of the magnetic tapes at either station 6 or 7, the Mode selector dial 29 is set to the corresponding Playback position. Circuits are then established for gating either the left read coil 190 and associated amplifier 224 or the right read coil 191 and associated amplifier 225. The outputs from one or the other of the amplifiers 224 or 225 are applied through the Or block 196 to set a Read trigger 226. The state of the Read trigger as it is conditioned on or off in response to bits being read is reflected by line 227 to gate an And network 228. During the Read operation, clocking pulses are supplied by the magnetic emitter 90 and through the Magnetic Emitter Selection block 211 and by way of bus 229 to the And network 228. Outputs from the And network 228 are supplied to the Or network 15 and by way of the cable 17 to fire the thyratrons 150–157 and thereby energize the associated relays R59–R37 in the bit register 16. The set up of the relays R59–R37 is applied by cable 215 to control print selection or functions of the printer 3.

During the backsweep of the head, a parity checking operation is performed to insure that an odd parity of bits is maintained for each character recorded on the tape. This is in accordance with the previously mentioned U.S. Patent 3,115,620. For checking purposes, the tape unit is automatically placed into a Read mode and impulses representing the bits previously recorded during the outswing of the head are supplied by either amplifier 224 or 225 and by line 216 to set Error trigger 184 on and off as reading progresses. The status of Error trigger 184 is supplied to the shaper 220 at a particular time late in the reading cycle. In the event of an Error, the output of the shaper 220 is then applied by line 217 to fire thyratron 186 which then energizes relay R111 to indicate the error.

Error trigger 184 is used in this fashion only during a Record operation. During a Read operation, as each character is entered into the relay bit register 16, the status of the register is checked for proper parity by means of a circuit 218.

Also shown in FIG. 15 is a line revision area 206 which is covered in the present case.

The aforementioned Sims application (Serial No. 377,897) discloses the line readjustment feature designated 205, FIG. 15.

The foregoing generally summarizes the over-all data flow of the system discussed herein.

A detailed discussion of all phases of operation of the recording and printing apparatus of FIGS. 1 and 15 is presented in the aforementioned Sims application. Included in the discussion of the Sims application are the Recording and Checking operation, the Search operation, the Playback operation, and the Readjustment (Adjust) operation.

Only so much of the Sims application as is deemed necessary for an understanding of the present invention is included in the drawings and description of the present application.

While only a portion of the drawings of the Sims application have been included herein, thereby requiring renumbering of certain of the drawings, the reference numerals used throughout the present case correspond exactly with those used in the Sims case for ease in correlation of the two cases.

The designation of the drawings in the two cases are given below for a ready comparison.

Figures 5, 6:
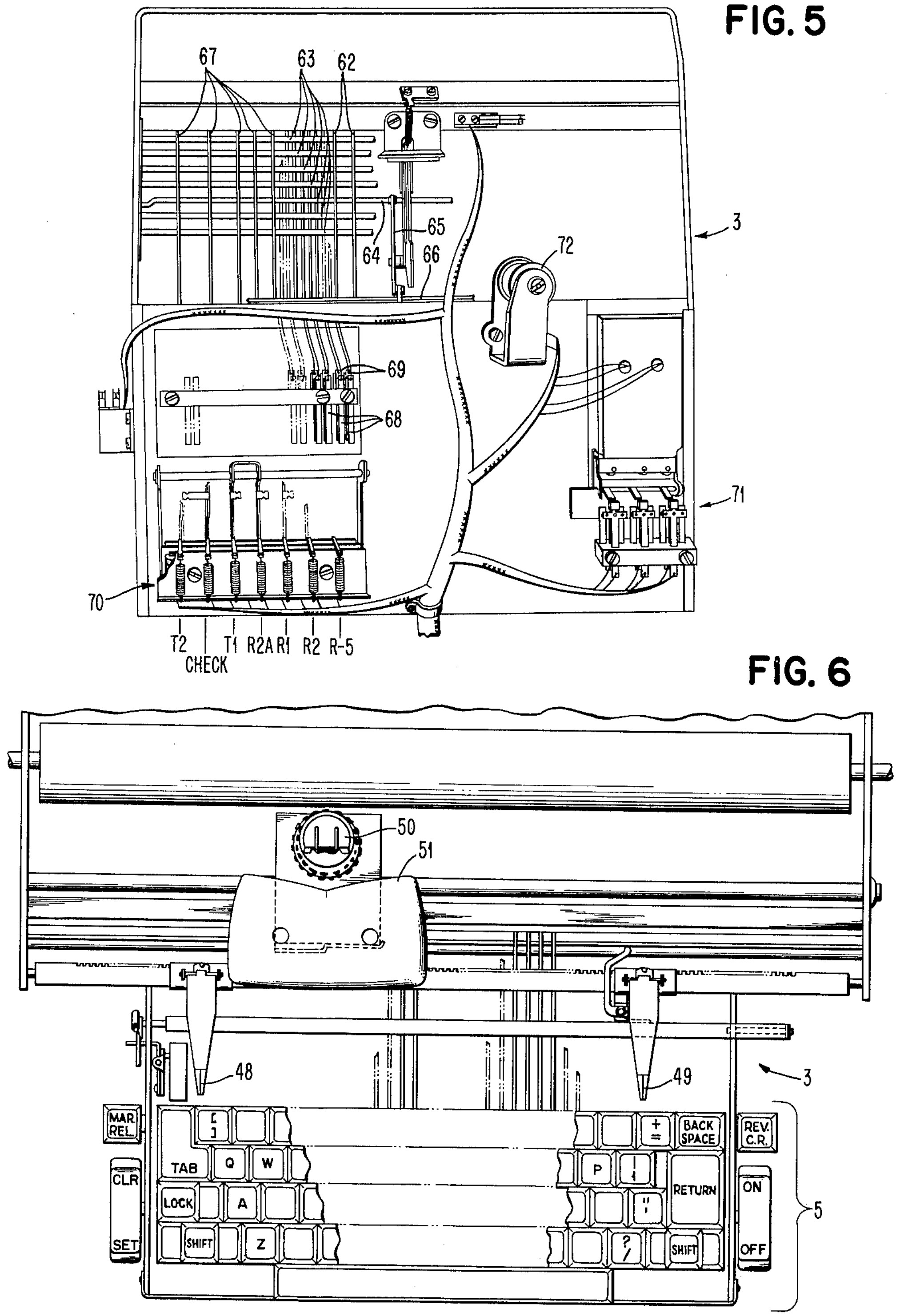
FIG. 5 is a bottom elevation of the printer of FIG. 1 with the covers removed.
FIG. 6 is a top elevation of the printer of FIG. 1 with the covers removed.
Figures 8, 9:
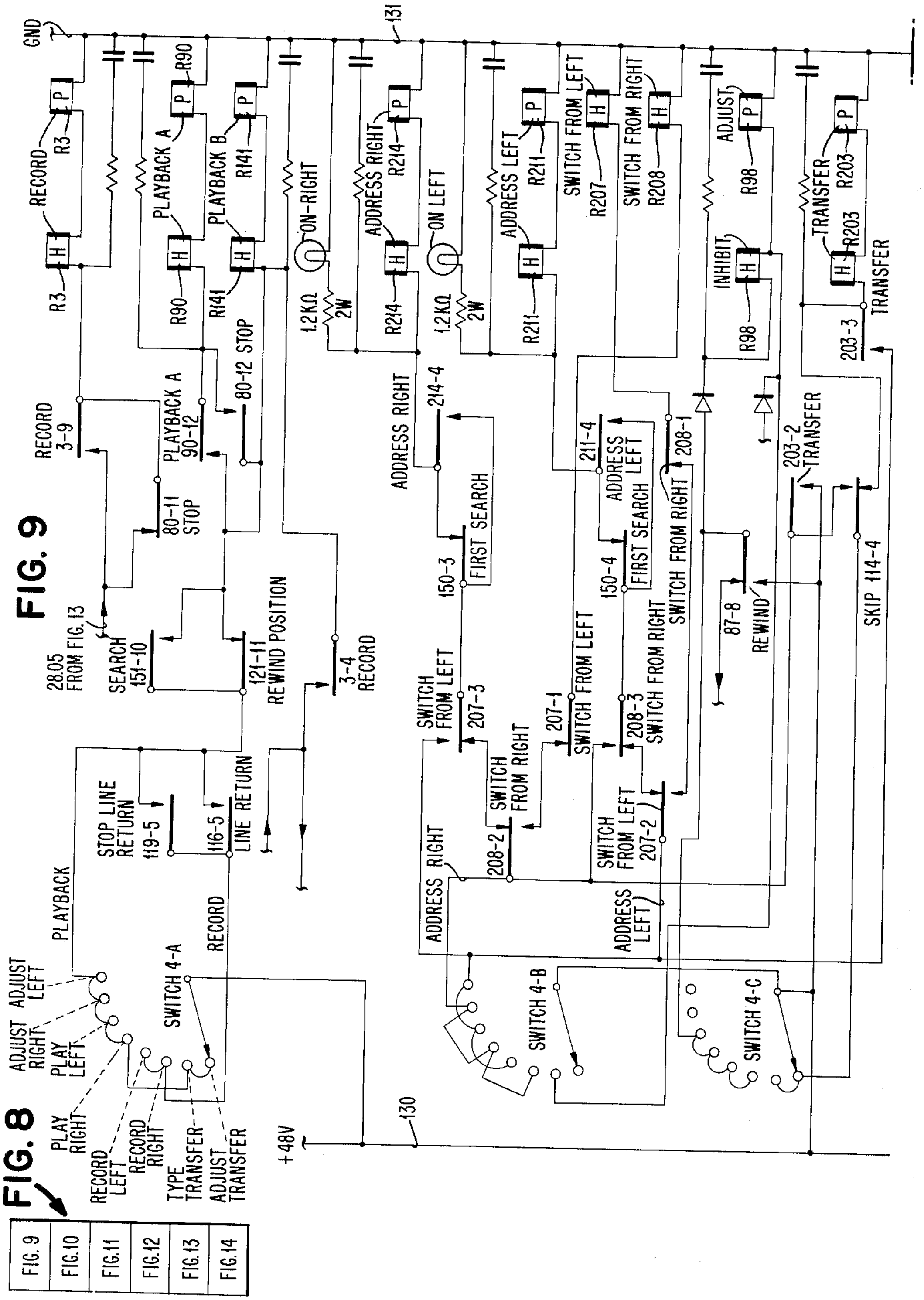
FIG. 8 is a suggested arrangement of FIGS. 9–14 for convenience in reference.
FIGS. 9 through 14 show certain relay circuits in the apparatus of FIG. 1 wherein FIG. 9 includes the mode control and addressing circuits.
Figure 10:
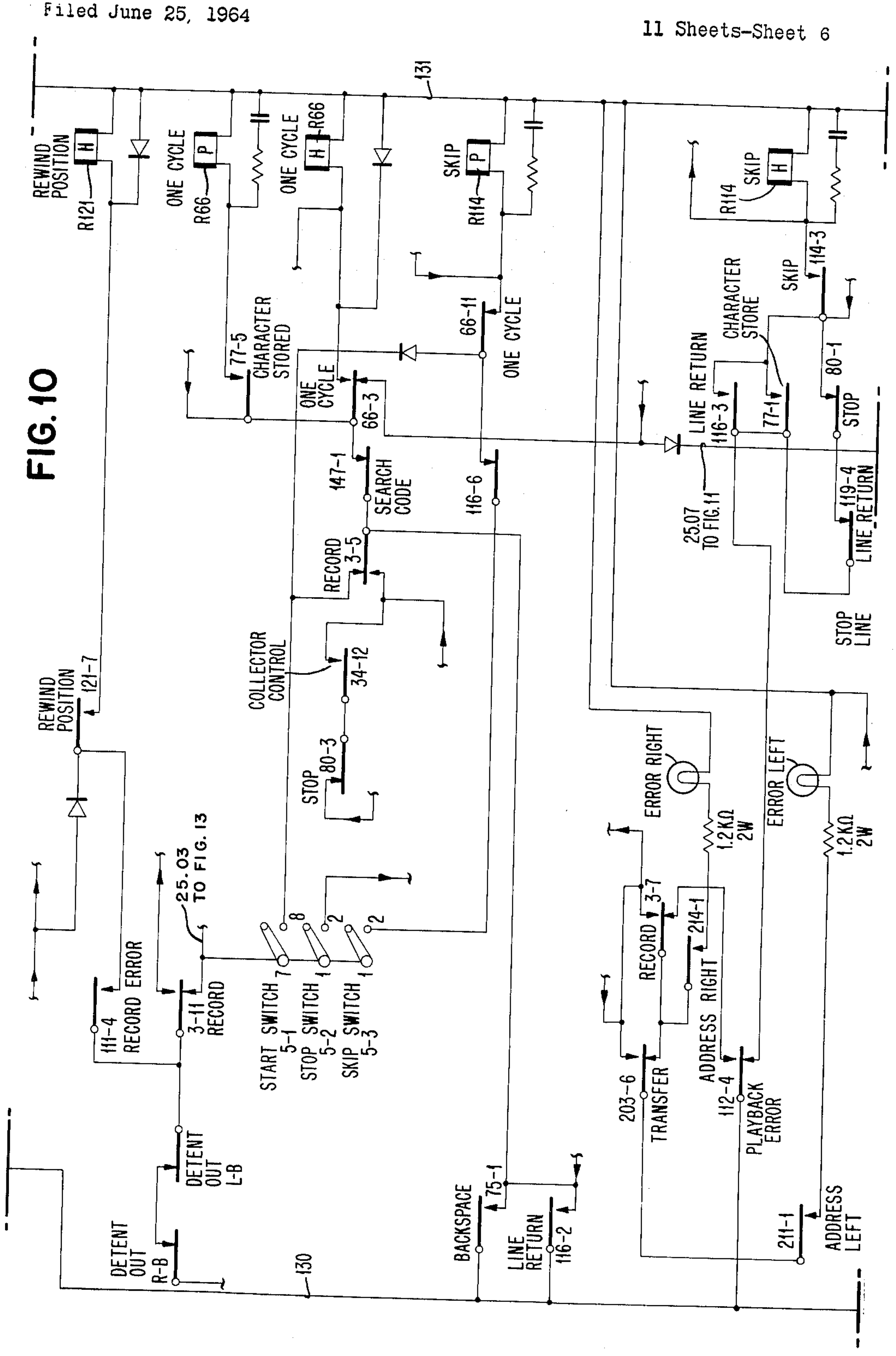
Figure 11:
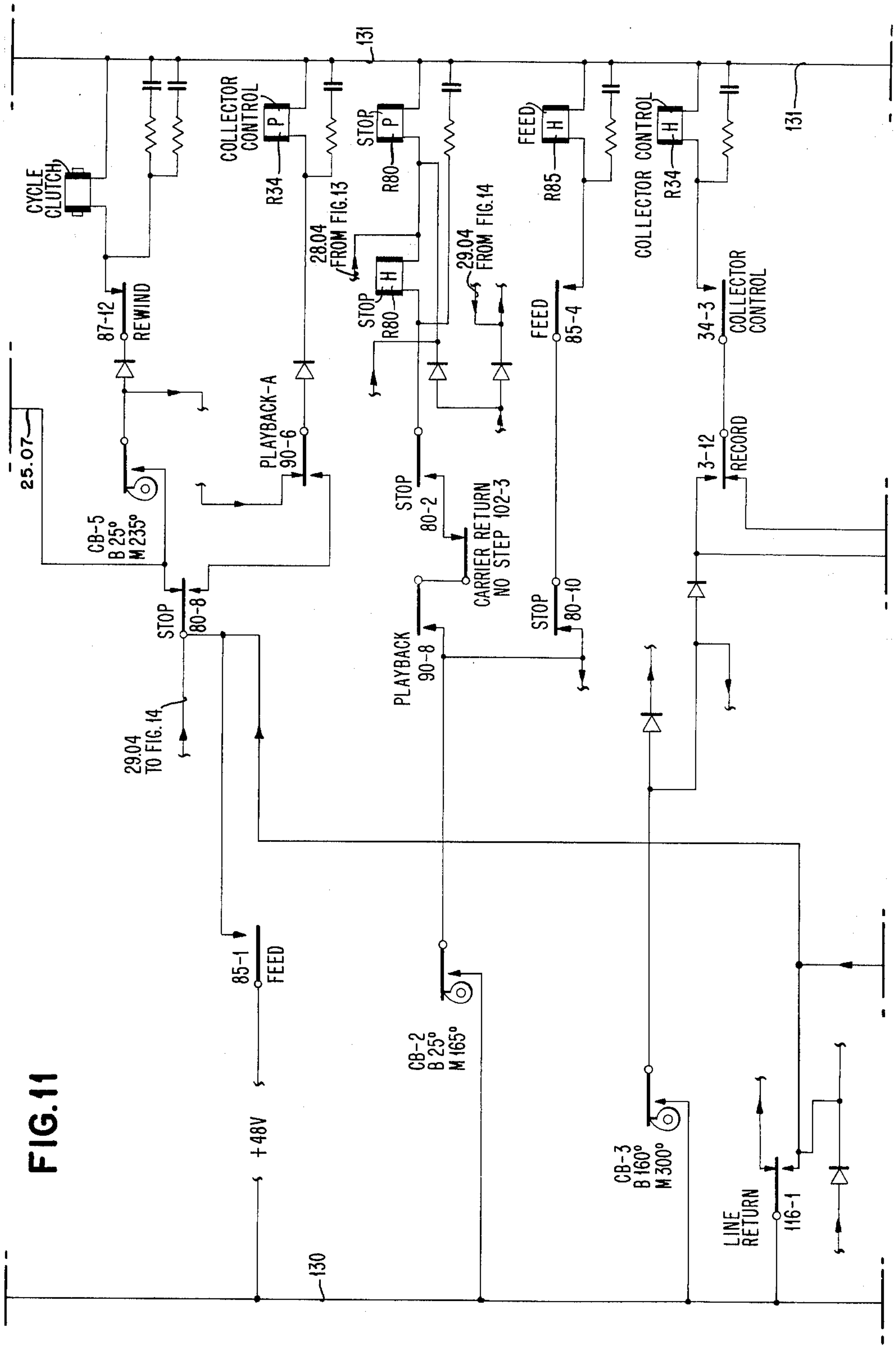
Figure 13:
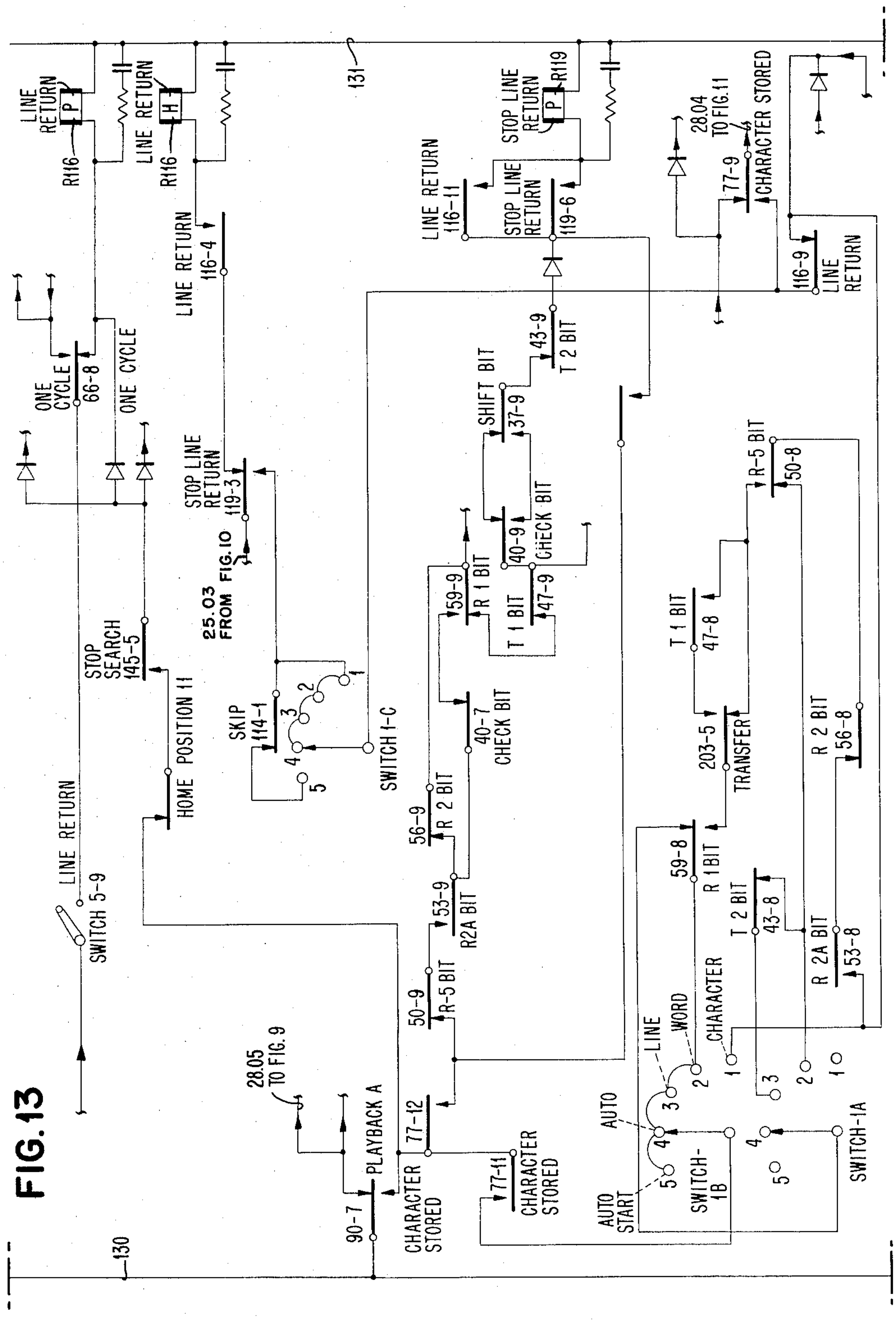

| Serial No. 377,897 FIG. No. | Present Application FIG. No. |
|---|---|
| FIG. 1 | FIG. 1 |
| FIG. 2 | FIG. 2 |
| FIG. 3 | FIG. 3 |
| FIG. 4 | FIG. 4 |
| FIG. 5 | FIG. 5 |
| FIG. 6 | FIG. 6 |
| FIG. 9 | FIG. 7 |
| FIG. 23 | FIG. 8 |
| FIG. 24 | FIG. 9 |
| FIG. 25 | FIG. 10 |
| FIG. 26 | FIG. 11 |
| FIG. 27 | FIG. 12 |
| FIG. 28 | FIG. 13 |
| FIG. 29 | FIG. 14 |
| FIG. 49 | FIG. 15 |

For ease in cross-referencing the two cases, the same system for referencing input and output lines to the various relay drawings is used in the present application as is used in the copending Sims application. For example, referring to FIG. 9 herein, which is FIG. 24 in the Sims application, line 24.01 is indicated as being directed to FIG. 11, which is FIG. 26 in the Sims application as noted in the conversion table given directly above.

*Record operation*

An illustrative letter or message, which corresponds to the printed area 12 on document 10, FIG. 1, may be printed as follows. This message is extracted from one presented in the aforementioned Sims application Serial No. 377,897.

This is a message recorded on the Magnetic Tape Apparatus. This message will be played in the normal mode and in the adjusting mode. Illustrations of the different operations that can be done will follow, including the syllable hyphen already shown in the two places above.

*Line revision*

During the initial preparation of a document, such as document 10, and the corresponding recordation of characters or functional codes on the tape, it may happen occasionally that errors or emissions occur. According to one aspect of the present invention whenever the Carrier Return button 46, FIG. 4, is depressed, an extra or redundant Feed code is automatically recorded on the tape at the station being addressed. Subsequently, the extra Feed code related to a particular line or a number of Feed codes, each related to an individual line, can be used for expanding the original information a number of characters equal to the number of Feed codes utilized. For example, one redundant Feed code will permit the expansion of the line to include an additional character, two redundant Feed codes will permit the accommodation of two additional characters during correction procedures, and so on. In any case, a predetermined standard increment of space above that normally required for the Carrier Return Code is allotted for expansion of recorded information. The allotment of a standard increment of space for expansion simplifies revision of the record media and also eliminates undue waste of record media space. In order to maintain the initial arrangement of the material on the tape that is unaffected by the correction procedures, it is necessary to avoid automatic insertion of the redundant Feed code during the revision procedures. The "Revise Carrier Return" button 47, FIG. 4, is used at this time. Depression of this button will result in a Carrier Return of the printer 3, but will not result in the automatic recording of the redundant Feed code as during the initial recording procedures when Carrier Return button 46 is depressed.

It is apparent that the equipment could be set up to insert more than one Feed code following each normal Carrier Return instead of just one Feed code, as is presently suggested. Even with the equipment disclosed herein, additional room for expansion of a line can be provided for by the typist during the preparation of the original document by simply recording additional redundant feed codes after every Carrier Return operation by depression of Feed code button 39 in FIG. 3.

Considering conditions when the machine is first turned on, regardless of the setting of the Mode selector knob 29, the machine will first go into a Record mode. This is done by picking and holding Record relay R3, FIG. 9. This is accomplished by +48 volts through a 90–7 normally closed relay contact in FIG. 13, over line 28.05 to a normally closed relay point 8–11 and to the Record relay pick and hold coils.

Mode knob 29 controls three switch sections designated 4–A, 4–B, and 4–C, FIG. 9. The various positions of the switch section 4–A are designated in correspondence with the settings of knob 29 in FIG. 3. It will be understood that the corresponding positions of switch sections 4–A and 4–C have designations that correspond respectively to the designations given for switch section 4–A. The mode of operation of the machine is controlled by switch sections 4–A and 4–C. The station addressing is under control of switch section 4–B where an evident path can be traced for picking and holding relay R211 when the left station 6 is addressed and for picking and holding relay R214 when the right station 7 is addressed.

It is assumed that a document or sheet of paper 10 is in position in the printer 3 and that the typist is ready to type and record the first character in the sample message presented above. Recording takes place as described in connection with FIG. 15 with each character being recorded under control of contacts C1, FIG. 12, in printer 3. The cycle clutch, FIG. 11, is energized through CB–5 and the 87–12 point by a circuit from line 27.04, and 3–1 point, now transferred, and the C1 contacts, FIG. 12.

The recording of a functional character such as Space, Tabulation, and similar characters proceeds in a manner that is comparable to that for recording an informational type character with the exception that the C5 contacts in the printer 3 are utilized instead of the C1 contacts. The C5 contacts are shown in FIG. 12. When the C5 contacts transfer, +48 volts is available through the C2 contacts, the C5 contacts transferred, and line 27.04 to follow the same path for initiating a cycle in the tape unit and for storing the bit representations for functional characters as previously discussed.

Various tape unit control panel contacts can be used to originate characters instead of the printer 3. These characters would be derived for example from the Backspace code button 37, the Stop code button 38, the Feed code button 39, and similar buttons on control panel 4 in FIG. 3.

*Recording of carrier return code and associated feed code for permitting subsequent line revision*

During the recording of the sample message, depression of the Carrier Return key 46 on keyboard 5 of printer 3 initiates a cycle of operation in the printer so that contacts C6 in FIG. 12 are transferred. The +48 volts will then be available through the C2 contacts, the C5 contacts, and the C6 contacts, the 77–4 point, the 90–9 point, the 34–7 point and the Carrier Return transmitting contacts in FIG. 12 to pick the Carrier Return Feed relay R71. The Carrier Return Feed relay is held through its own 71–1 point and an 85–2 point to the +48 volt line 130 in FIG. 12. Picking of relay R71 results in the transfer of relay point 71–4 and the subsequent picking of Carrier Return Interlock relay R69. The Carrier Return Interlock relay R69 is held through its own point 69–4, the 90–4 Playback point, and the 71–2 point through the 85–2 point to the +48 volt supply line 130.

Following the energization of relays R69 and R71, the C6 contact returns to its normally closed position. When this happens, +48 volts is available in FIG. 12 through the 90–3 point and by way of line 27.03 to FIG. 14. From there the path traces through a 77–3 point, a diode, and the Carrier Return Interlock point 69–1, now transferred, to the line 29.04. Line 29.04 is directed to FIG. 11 and, goes through the stop point 80–8 and CB–5 to energize the cycle clutch.

In FIG. 11, the 85–1 Feed points are utilized to get a second cycle in order to record a redundant Feed code following the recording of the Carrier Return code which transpires during the first cycle. The recording of the Carrier Return code in the tape occurs in a manner comparable to that for recording any of the characters previously discussed.

Relay R77 is energized as described in the Sims application and results in the picking of the One Cycle relay R66, FIG. 10. The One Cycle relay R66 is picked whenever the Carrier Return button is depressed or whenever the Revise Carrier Return button is depressed.

When the One Cycle relay R66 picks up, the 66–12 points in FIG. 12 transfer and together with the 71–3 points result in the picking of the Feed relay R85. The Feed relay R85 is held through its own 85–4 point in FIG. 11, and through CB–2 to +48 volts on line 130. As previously noted, the 85–1 point in FIG. 11 will again direct +48 volts to energize the cycle clutch in FIG. 11.

A Feed relay point 85–3, FIG. 15, conditions the thyratrons for storing the bits representing a Feed code.

*Search operation*

It is important that the operator be able to select one of a number of blocks of information, letters, or messages, such as the sample message previously given, since most applications require a wide variety of correspondence. For this purpose, a Search capability is provided in the present apparatus that is responsive to the Reference code identifiers to locate a particular message. As previously noted, depression of Reference code button 40, FIG. 3, effects recording of reference code sequences that are later recognized during the Search operation for locating a desired block of information, such as block 27 indicated in window 28, FIG. 3. A Search operation is usually initiated by depressing Search button 33, FIG. 3. The Search operation is fully described in the copending Sims application Serial No. 377,897, but will also be described hereinafter by particular reference to FIGS. 7 and 15. The Search operation is performed under control of a relay counter network 207 and a selection and control block 208, FIG. 15. Block 208 is generally under control of Control panel 4 by bus 244. Block 208 includes switches that are preset under control of selector knob 27 to a count level representing the block of information required, by rotating knob 27. Searching for a particular block of information on either tape 80 or 81 is performed by positioning head slide 88 in such a manner that magnetic heads 96 and 97 are located adjacent the Search bit channel, FIG. 2. Searching can then proceed at high speeds on either tape in a longitudinal direction. The general manner of searching is set forth in the paper "Read-Record at 45°" that appeared in the IBM Technical Disclosure Bulletin, March 1964, volume 6, No. 10, on page 80, authored by L. M. Cooper.

In order to position head slide 88, FIG. 7, so that heads 96 and 97 are in proximity to the search track, cycle clutch 92 is energized by bus 245, FIG. 15. Head slide 88 then moves outwardly (toward the bottom of FIG. 7) across the tapes 80 and 81. Normally, a search magnet 98, also controlled by block 208, FIG. 15, is energized during each cycle when a Search operation is not in effect. Slide 88 has an extension 99 which passes adjacent the armature 100 on search magnet 98. When magnet 98 is energized, as it normally will be, armature 100 is pulled out of the way of extension 99. When, however, a Search operation is required, magnet 98 is not energized and due to the biasing effect of a spring 101, armature 100 will be up in the path of the extension 99 on the return sweep. When this happens, slide 88 is then held in a position so that heads 96 and 97 can read the search bit track for searching purposes.

Searching then proceeds at high speeds longitudinally of the tape. As each Reference code is encountered, it is recognized by Search Sequence Identifier block 198, FIG. 15. The output of block 198 is applied by line 209 to step counter 207.

The integration and recognition of Reference codes is taught in U.S. Patent 3,209,340, noted in the copending Sims application Serial No. 377,897. U.S. Patent 3,209,430 derived from application Serial No. 114,462, filed June 21, 1961, with C. O. Pingry III, as inventor and is entitled, "Record Positioning Apparatus." Pingry also teaches motor drive control for moving a selected tape longitudinally. As noted in the copending Sims application (Serial No. 377,897), a suitable Counting means is disclosed in the paper published in the IBM Technical Disclosure Bulletin, vol. 6, No. 11, April 1964, pages 23 and 24, entitled, Relay-Capacitor Counter, by D. E. Sims and R. F. Ross. When the count level of counter 207 agrees with the setting of switches 208, a "Block located" signal is supplied on line 213. The "Block located" signal on line 213 is applied to block 208, FIG. 15, and serves to control the motor drive as taught in the Pingry patent. In order to restore slide 88 to its home position, FIG. 7, magnet 98 is again energized, pulling armature 100 out of the way and permitting slide 88 to return to the home position. Switch assembly 102 is operated when slide 88 is in proper position for searching. Switches 103 are referred to as the Home Position switches and are transferred each time slide 88 goes through a cycle of reciprocation.

*Correction procedures using the line revision technique*

It is now assumed that the block of information containing the original message previously presented has been located by the search procedures just described.

In typing the original message, the word "different" was typed with only one "f." In order to correct the information recorded on the tape so that the word is spelled properly, provision is made for revising the word following the procedures outlined below. It is assumed that the Mode control knob 29 has been set to Playback either for the left or right tape. Typing of the information from the selected tape during Playback will proceed under control of the Start condition knob 26 in FIGS. 4 and 13. Playback of characters occurs as described in connection with FIG. 15.

Start Condition knob 26 has five positions respectively designated Auto Start, Auto, Line, Word, and Character. The Auto Start and Auto positions will condition the tape unit for automatically playing back the information in a continuous fashion. If the Start Condition knob 26 is moved to the Line position, the tape unit will play back a line of information and stop whenever a Carrier Return code is recognized. If the Start Condition knob 26 is placed at the Word position as shown in FIG. 3, the tape unit will stop after the typing of each word. If the Start Condition knob 26 is placed in the Character position, the tape unit will play back a single character at a time and stop after each character. The Start Condition switch sections in FIG. 13 are designated 1A, 1B and 1C.

The conditioning of the tape unit for stopping under the various situations determined by the setting of the Start condition switch sections shown in FIG. 13 is determined by various relay points associated with the switch and located directly to the right of the switch in FIG. 13.

When switch sections 1A, 1B and 1C in FIG. 13 are in the Auto Start or Auto position, only a Stop code or a Stop Transfer code will result in stopping the tape unit. When the switch sections are in the Line position, a stop condition will occur whenever a Stop code, a Stop Transfer code, or a Carrier Return code is recognized. When the switch sections are in the Word position, the unit will stop whenever a Stop code, a Stop Transfer code, Space code, a Tab code or a Carrier Return code is recognized. When the switch sections are in the Character position, the unit will stop after each character is printed.

Assuming the situation where the word "different" was mistyped as indicated above, the operator would keep the unit in an automatic playback condition until the third line ending with "adjusting" is encountered, at which time the typist would switch the Start Condition knob to the line position.

When the Carrier Return code is encountered at the end of that line, the machine will be stopped in the following manner. A +48 volt potential is available through the 90–7 point in FIG. 13, the 77–11 point, now transferred, the switch section 1B sliding contact, terminal 3 of switch section 1B, relay point 59–8, sliding contact of switch section 1A, terminal 3 of switch 1A, relay point 43–8, relay point 50–8, relay point 56–8, relay point 56–8, relay point 53–8, now transferred because of the recognition of the Carrier Return code, Line Return contact 116–9, contact 77–9, now transferred, and by line 28.04 directly to FIG. 11 to pick the Stop relay R80.

A certain amount of information will be printed out each time the operator depresses the Start button, the amount being determined by the setting of the Start Condition knob 26. It will be assumed that the Start Condition knob 26 is next placed in the Word position, FIG. 13. When this takes place, the tape unit will Start reading each time Start button 30 is depressed and the Space following each word in the first portion of the fourth line of the sample message will cause the unit to stop. This takes place in the following manner. Relay 90–7 in FIG. 13, relay point 77–11, switch section 1B through terminal 2, 59–8 point, switch section 1A and terminal 2 of switch 1A, relay point 50–8, relay point 56–8, relay point 53–8, now transferred, and through the same path as described for the Carrier Return code recognition over line 28.04 to pick the Stop relay R80 in FIG. 11.

It is now assumed that almost all words prior to "different" have been printed. The knob 26 is then moved to the Character position. When this happens, the tape unit will start reading each time Start button 39 is depressed and will stop after the recognition of each character. This will likely take place, for example, for the word "the," prior to "different," the space following the word "the," and for the first two characters "di" of the word "different." The path to stop the unit after each character is as follows. A +48 volt potential is available through the 90–7 point transferred, in FIG. 13, through the 77–11 point transferred, through switch section 1B to terminal 1, and directly through the relay point 116–9 and relay point 77–9 transferred, by line 28.04 to pick the Stop relay R80 in FIG. 11 after each cycle.

Other characters requiring a stop condition for the correction of information recorded on the tape when the Start condition knob 26 is in its various positions are handled in a similar fashion.

The character "f" is now typed by the operator with the equipment in the Record mode so the character is also recorded on the tape.

When the additional "f" is inserted in the word "different," the operator can then type out the balance of the line including "oper-".

This time, however, instead of depressing the Carrier Return button 46 on the printer, FIG. 4, in the usual manner, the operator will depress the Revise Carrier Return button 47 instead. Referring to FIG. 12, the Revise Carrier Return transmit contacts are connected directly to the Carrier Return interlock relay R69 through 77–4, 90–9, and 34–7. The Carrier Return Feed relay R71 is bypassed so that no Feed code will be recorded on the tape as it normally would be under control of Feed relay 85 when the normal Carrier Return button 46 is depressed on the printer.

Also, if too many characters were originally printed and recorded, i.e., the word "different" was printed and recorded as "different" with one "f" too many, the same procedures can be used to locate the incorrectly recorded information and delete the extra "f." Another redundant Feed code can be recorded at the end of the line in which the "f" appeared to make the line as long as it was originally.

The Skip button 32 on the control panel 4 in FIG. 3 can be used for skipping information read from the tape entirely if desired. The amount of material skipped will depend upon the setting of the Start Condition knob 26. The skip modes of operation will be effective in the Auto mode, the Line mode, the Word mode, or the Character mode. In the Auto mode, all information will be skipped until a Stop code or a Stop Transfer code is encountered. Most often, the Skip mode will be used when the Start Condition knob 26 is set in the word or character position. The setting up of the stop action in the tape unit occurs during the skip mode of operation just as it does during a printing operation upon the occurrence of the characters that are effective during the various modes, that is the Auto mode, the Line mode, the Word mode, or the Character mode established by the Start Condition knob 26.

*Line return*

Occasionally, it may happen that the operator has proceeded on the tape beyond the line of information that is desired. When this happens, the tape unit can be caused to step back to the last encountered Carrier Return code by depressing the Line Return button 35 on control panel 4 in FIG. 3. As soon as a Carrier Return code is recognized, the tape unit will immediately stop over the Carrier Return code.

The Start Condition knob 26 is effective during the Playback mode. The Line Return operation is initiated by depressing the Line Return switch 5–9 in FIG. 13. Immediately +48 volts will be applied through the 66–8 point to pick the Line Return relay R116. The Line Return relay holds through its own 116–4 point and the 119–3 point in FIG. 13. Cycling of the tape unit will then take place under control of the 116–2 point in FIG. 10, through the 147–1 point, the 66–3 point and by line 25.07 to FIG. 11 to pick the cycle clutch. Backstepping of the tape involved will be under control of the 116–12 point in FIG. 15.

As soon as the Carrier Return code (R2A bit) is recognized during backstepping and reading of the tape, the 53–9 point, FIG. 13, will transfer. A +48 volts will then be applied through the 90–7 point, the 77–12 point, now transferred, and the 53–9 point, the 56–9 point, the 59–9 point, the 47–9 point, the 40–9 point, the 37–9 point, the 43–9 point, the 116–11 point, now transferred, to energize the Stop Line Return relay R119.

Energization of relay R119 will drop the Line Return relay R116 because of the transfer of relay point 119–3 in FIG. 13. At the same time, the Stop relay R80, FIG. 11, is energized through the circuits previously discussed in FIG. 13 by line 28.04.

It is apparent from the foregoing that a new and useful arrangement for preparing, locating and correcting information recorded on a record media has been disclosed herein. The principles of the present invention lead to more efficient record processing and document preparation.

While the invention has been particularly shown and described with reference to a preferred embodiment thereof, it will be understood by those skilled in the art that various changes in form and details may be made therein without departing from the spirit and scope of the invention.

A greater or lesser number of data unit types may be provided for in the apparatus. The data unit types may include, in one case, only words and characters, in another case, blocks, words, and characters, or some combination other than that discussed. Data unit types having designations other than those indictaed may be selected for recognition. A block of information may comprise some data unit normally larger than a word (and based on different criteria than a line of information), such as a sentence, a sub-paragraph, a paragraph, several paragraphs, or one or more letters or messages, according to the desires of the user, with appropriate selection by manipulation of the start condition means, block seletcion means, or comparable means.

What is claimed is:

1. Data recording and printing apparatus, comprising:

a printer, said printer having a plurality of informational and functional character keys;

means in said printer responsive to depression of any informational character key for printing the related character;

means in said printer responsive to depression of any function key for performing the related function;

recording apparatus interconnected with said printer, said recording apparatus having facilities for recording characters on and reading characters from a revisable record media;

means in said recording apparatus responsive to depression of a printer key to record a coded character in said record media representing the key depressed;

means for relatively moving said responsive means and said record media as characters are recorded so that each character occupies an increment of space of predetermined size in said record media;

and means in said recording apparatus automatically operative upon depression of a particular one of said function keys to operate said relative moving means and record the related character in said record media and to immediately thereafter operate said relative moving means again so that at least one redundant character space beyond that normally allotted during recording of characters is established in said record media for expansion of recorded information during subsequent revision of said record media.

2. Data recording and printing apparatus, comprising:

a printer, said printer having a printing means and a document-carrying means mounted for relative movement from a home position during printing and said printer having a plurality of informational and functional character keys for effecting said relative movement without printing;

means in said printer responsive to depression of any informational character key for printing the related character;

means in said printer responsive to depression of any functional key for performing the related function, including the relative movement of said printing means and document-carrying means under control of said movement keys;

recording apparatus interconnected with said printer, said recording apparatus having facilities for recording characters on and reading from a record media;

means in said recording apparatus responsive to depression of each printer key to record a coded character in said record media representing the key depressed;

means in said recording apparatus for relatively moving said recording apparatus responsive means and said record media as characters are recorded so that each character occupies an increment of space of predetermined normal size in said record media;

and means in said recording apparatus automatically operative upon depression of a movement key in said printer to operate the relative movement means in said recording apparatus and record a character in said record media representing said movement key and to immediately thereafter again operate the relative moving means in said recording apparatus so that at least one redundant character space beyond that normally allotted during recording of each character is established in said record media for expansion of recorded information during subsequent revision of said record media.

3. Data recording and printing apparatus, comprising:

a printer, said printer having a print head mounted on a carrier for movement from a home position adjacent a platen during printing and said printer having a plurality of informational and functional character keys including keys for effecting movement of said print head without printing;

means in said printer responsive to depression of any informational character key for printing the related character;

means in said printer responsive to depression of any functional key for performing the related function, including movement of said print head predetermined distances under control of said movement keys;

recording apparatus interconnected with said printer, said recording apparatus having facilities for recording characters on and reading from a revisable record media;

means in said recording apparatus responsive to depression of each printer key to record a coded character in said record media representing the key depressed;

means in said recording apparatus for relatively moving said recording apparatus responsive means and said record media as characters are recorded so that each character occupies an increment of space of predetermined normal size in said record media;

and means in said recording apparatus automatically operative upon depression of a movement key in said printer to operate the relative movement means in said recording apparatus and to record a character in said record media representing said movement key and to immediately thereafter again operate the relative movement means in said recording apparatus so that at least one redundant character space beyond that normally allotted during recording of each character is established in said record media for expansion of recorded information during subsequent revision of said record media.

4. Data recording and printing apparatus, comprising:

a printer, said printer having a print head mounted on a carrier for movement from a home position adjacent a platen during printing and said printer having a plurality of informational and functional character keys for effecting movement of said carrier without printing;

means in said printer responsive to depression of any informational character key for printing the related character;

means in said printer responsive to depression of any functional key for performing the related function, including movement of said print head predetermined distances under control of said movement keys;

recording apparatus interconnected with said printer, said recording apparatus having a Feed code encoding network and facilities for recording characters on and reading from a magnetic revisable media;

means in said recording apparatus responsive to depression of each printer key or signals from said Feed code encoding network to record a coded character in said record media;

means for feeding said media by intermittent steps following each character recording operation as well as in response to the recording of a Feed code;

and means in said recording apparatus operative upon each depression of a movement key to record a character in said record media representing said movement key and to also render said Feed code encoding network effective to record at least one Feed code in said record media thereby establishing redundant space in said record media for subsequent use during revision of said record media.

5. Data recording and printing apparatus, comprising:

a printer, said printer having printing means and a platen that are relatively movable from a home position during the course of printing on a document and said printer having a plurality of informational and functional character keys including a Return key;

means in said printer responsive to depression of any informational character key for printing the related character;

means in said printer responsive to depression of any functional key for performing the related function, including the restoration of said printing means and platen to home position when said Return key is depressed;

recording apparatus interconnected with said printer, said recording apparatus having facilities for recording coded charatcers on and reading coded characters form a revisable record media, said coded characters being charatcerized as printer characters to which said printer responds or non-printer characters to which said recording apparatus responds;

means in said recording apparatus responsive to depression of each printer key to record a coded character in said record media representing the key depressed, including the recording of a Return code upon each depression of said Return key;

encoding means in said recording apparatus for supplying code signals representative of non-printer charatcer codes;

and means automatically operative following each depression of said Return key and the recording to the related coded character to render said encoding means effective to supply code signals and to initiate another recording operation for recording at least one redundant non-printer character in said record media for expansion of printer characters during subsequent revision of said record media.

6. The apparatus of claim 5 which further comprises:

a Revise Return key on said printer;

means for locating a particular group of characters in said record media in order to revise the same;

means operative in said recording apparatus to read each character and to direct the same to said printer for printing;

and means operative upon depression of said Revise Return key for inhibiting the recording action normally initiated by said encoding means upon depression of said Return key.

7. Data recording and printing apparatus, comprising:

a printer, said printer having a print head mounted on a carrier for movement from a home position adjacent a platen during printing and said printer having a plurality of informational and functional character keys including a Carrier Return key;

means in said printer responsive to depression of any informational character key for printing the related character;

means in said printer responsive to depression of any functional key for performing the related function, including return of said carrier to its home position when said Carrier Return key is depressed;

recording apparatus interconnected with said printer, said recording apparatus having facilities for recording coded characters on and reading from a revisable record media, said characters being categorized as printer characters to which said printer is responsive and redundant characters to which said printer is nonresponsive;

means in said recording apparatus responsive to depression of each printer key to record a coded character in said record media representing the key depressed;

and encoding means in said recording apparatus automatically operative upon each depression of said Carrier Return key to record a Carrier Return code and to also record a redundant character code in said record media, said redundant character recording thereby establishing additional space for subsequent use during revision of said record media.

8. Data recording and printing apparatus, comprising:

a printer, said printer having a print head mounted on a carrier for movement from a home position adjacent a platen during printing and said printer having a plurality of informational and functional character keys including a Carrier Return key;

means in said printer responsive to depression of any informational character key for printing the related character;

means in said printer responsive to depression of any functional key for performing the related function, including return of said carrier to its home position when said Carrier Return key is depressed;

recording apparatus interconnected with said printer, said recording apparatus having facilities for recording coded characters in and reading coded characters from a revisable record media;

means in said recording apparatus responsive to depression of each printer key to record a coded character in said record media representing the key depressed;

a circuit in said recording apparatus for encoding a Feed code for recording on said record media;

and means in said recording apparatus automatically operative upon each depression of said Carrier Return key to record a Carrier Return character and to render said encoding circuit effective to record at least one redundant Feed code in said record media.

9. The apparatus of claim 8 which further comprises:

a Revise Carrier Return key on said printer;

means for locating a particular group of characters in said record media in order to revise the same;

means operative in said recording apparatus to read each character and to direct the same to said printer for printing;

and means operative upon depression of said Revise Carrier Return key for inhibiting the action of said Feed code encoding circuit that normally takes place when said Carrier Return key is depressed.

10. Data recording apparatus, comprising:

a data source, said source supplying data signals representative of characters of information categorized into a number of types of data units respectively designated according to size from largest to smallest as blocks, lines, words, and characters of information, each of said data units including a distinctive identifier character and each larger data unit comprising data units of the next smaller size;

recording apparatus interconnected with said source, said recording apparatus having facilities for recording a record media in accordance with the data signals from said source, and in the order supplied by said data source;

means in said recording apparatus for reading previously recorded data signals;

start condition control means having a plurality of settings corresponding to said data unit types for selecting a particular type of data unit;

means for starting a reading operation in order to derive data representing signals grouped according to the order determined by said selecting means;

and means in said recording apparatus controlled by said start condition control means and responsive to the recognition of the distinctive identifier character associated with the currently selected type of data unit for stopping the reading operation.

11. Data recording apparatus, comprising:

a data source, said source supplying data signals categorized into a number of data unit types respectively designated according to size from largest to smallest, each of said data units including a distinctive identifier character, and each larger data unit comprising data units of the next smaller size;

recording apparatus interconnected with said data source, said recording apparatus having facilities for recording on a record media in accordance with the data signals from said source;

means in said recording apparatus for reading previously recorded data signals;

start condition control means having individual settings corresponding to said data unit types for selecting a particular type of data unit for reading;

means for starting a reading operation;

and means in said recording apparatus controlled by said start condition control means and responsive to the recognition of the distinctive identifier character associated with a selected type of data unit for stopping the reading operation.

12. Data recording and printing apparatus, comprising:

a printer, said printer supplying data signals in progressively different units respectively designated according to size from largest to smallest as blocks, lines, words and characters of information, said units being identified by reference codes, line return codes, space codes, and the characters themselves, respectively, and each larger data unit comprising data units of the next smaller size;

recording apparatus interconnected with said printer, said recording apparatus having facilities for recording in a record media in accordance with the data signals from said printer;

means in said recording apparatus for reading previously recorded data signals;

condition control means having individual settings corresponding to said data unit types for selecting a particular type of data unit for reading;

means for starting a reading operation;

and means in said recording apparatus controlled by said condition control means and responsive to the recognition of the identifier code associated with a selected type of data unit for stopping the reading operation.

13. Data recording and printing apparatus, comprising:

a printer, said printer havig a plurality of informational and functional character keys with provision for printing data in a number of data unit types respectively designated according to size from largest to smallest as blocks, words, lines, and characters, each of said data units including a distinctive identifier character, and each larger data unit comprising data units of the next smaller size;

means in said printer responsive to depression of any informational character key for printing the related character;

means in said printer responsive to depression of any functional key for performing the related function;

recording apparatus interconnected with said printer, said recording apparatus having facilities for recording characters on and reading from a record media;

means in said recording apparatus responsive to depression of each printer key to record a coded character in said record media representing the key depressed and in the data unit order as supplied by said printer;

condition control means having individual settings corresponding to said data unit types for selecting a particular type of data unit for reading and printing;

means for starting a reading and printing operation;

and means in said recording apparatus controlled by said condition control means and responsive to the recognition of the distinctive identifier character associated with a selected type of data unit for stopping the reading and printing operation.

14. Data recording and printing apparatus, comprising:

a printer, said printer supplying data signals categorized into a number of data units respectively designated according to size from largest to smallest as blocks, lines, words, and characters of information, each larger data unit comprising data units of the next smaller size, and each data unit including a distinctive identifier character;

means in said printer responsive to depression of any informational character key for printing the related character;

means in said printer responsive to depression of any functional key for performing the related function;

recording apparatus interconnected with said printer, said recording apparatus having facilities for recording and reading characters stored in a record media and said recording apparatus further having a Reference encoding key;

circuit means in said recording apparatus responsive to depression of each printer key to record a coded character in said record media representing the key depressed, and in the data unit order as supplied by said printer, and said circuit means being further responsive to each depression of said Reference key to record a distinctive Reference code on said record media to identify a block of information;

a Search key;

means in said recording apparatus responsive to depression of said Search key for searching said record media;

information identifier means, said information identifier means being responsive to Reference codes encountered during searching to locate a particular block of information;

data unit condition control means having a plurality of settings corresponding to said data unit types for selecting a particular type of data unit within said particular block for reading and printing;

means for starting a reading and printing operation;

and means in said recording apparatus controlled by said condition control means and responsive to the recognition of the character associated with a said selected particular type of data unit for stopping the reading and printing operation.

15. Data recording and printing apparatus, comprising:

a printer, said printer having a plurality of information and functional character keys with provision for printing data in a number of data unit types respectively designated according to size from largest to smallest as blocks, words, lines, and characters of information, each of said data unit types including a distinctive identifier character, and each larger data unit comprising data units of the next smaller size;

means in said printer responsive to depression of any informational character key for printing the related character;

means in said printer responsive to depression of any functional key for performing the related function;

magnetic tape recording apparatus interconnected with said printer, said recording apparatus having facilities including a magnetic head movable transversely of said magnetic tape for recording and reading data bits representing coded characters in a plurality of code channels across said tape, and said recording apparatus further having a Reference encoding key;

circuit means in said recording apparatus responsive to depression of each printer key to record a coded character in said record media representing the key depressed and in the data unit order as supplied by said printer, and said circuit means being further responsive to depression of said Reference key for recording a distinctive Reference code in a particular code channel in said record media;

means in said recording apparatus responsive to depression of said Search key for positioning said magnetic head adjacent said particular code channel and initiating a search longitudinally of said media;

information identifier means, said information identifier means being responsive to Reference codes encountered during searching to locate a particular block of information;

data unit condition control means for selecting a particular type of data unit within said particular block for reading and printing;

means for starting a reading and printing operation wherein said magnetic head is restored for normal movement transversely of said record media;

and means in said recording apparatus controlled by said condition control means and responsive to the recognition of the character associated with a said selected particular type of data unit for stopping the reading and printing operation.

16. Data recording and printing apparatus, comprising:

a printer, said printer supplying and responding to data signals categorized into a number of types of data units respectively designated according to size from largest to smallest as blocks, lines, words and characters of information, said units being respectively identified by identifier reference codes, line return codes, space codes, and the characters themselves, and each larger data unit comprising data units of the next smaller size;

recording apparatus interconnected with said printer, said recording apparatus having facilities for recording coded characters in a revisable record media in accordance with the data signals from said printer and according to the data unit order supplied by said printer;

encoding means in said recording apparatus for generating signals representative of coded characters;

means in said recording apparatus automatically operative upon recognition of particular data signals supplied by said printer to record a predetermined related coded character and to concurrently render said encoding means effective to supply signals for recording redundant character space in said record media so that space is established in said record media beyond that normally required for said predetermined character to allow for expansion of recorded information during subsequent revision of said record media;

means in said recording apparatus for reading previously recorded data signals;

start condition control means for selecting a particular type of said data units for reading and printing;

means for starting a reading operation;

and means in said recording apparatus controlled by said condition control means and responsive to the recognition of the identifier code associated with a selected type of data unit for stopping the reading operation.

17. Data recording and printing apparatus, comprising:

a printer, said printer having a plurality of informational and functional character keys and supplying data signals categorized into a number of data unit types according to size from largest to smallest, each said data unit including a distinctive identifier character and each larger data unit comprising data units of the next smaller size;

means in said printer responsive to depression of any informational character key for printing the related character;

means in said printer responsive to depression of any functional key for performing the related function;

recording apparatus interconnected with said printer, said recording apparatus having facilities for recording characters on and reading from a revisable record media;

means in said recording apparatus responsive to depression of each printer key to record a coded character in said record media representing the key depressed;

means for relatively moving said responsive means and said record media as characters are recorded so that each character occupies an increment of space of predetermined size in said record media;

means in said recording apparatus automatically operative upon depression of a particular one of said function keys to operate said relative moving means and record the related character in said record media and to immediately thereafter operate said relative moving means again so that a redundant character space beyond that normally allotted during recording of characters is established in said record media for expansion of recorded information during subsequent revision of said record media;

condition control means for selecting a particular type of said data units for reading and printing;

means for starting a reading and printing operation;

and means in said recording apparatus controlled by said condition control means and responsive to the recognition of the distinctive identifier character associated with a selected type of data unit for stopping the reading and printing operation.

18. Data recording and printing apparatus, comprising:

a printer, said printer having a print head mounted on a carrier for movement from a home position adjacent a platen during printing and said printer having a plurality of informational and functional character keys, including a Carrier Return key;

transmitting means operable as keys are depressed in said printer for supplying data signals categorized into a number of data unit types according to size from largest to smallest, each said data unit being identified by a distinctive identifier character and each larger data unit comprising data units of the next smaller size;

means in said printer responsive to depression of any informational character key for printing the related character;

means in said printer responsive to depression of any functional key for performing the related function, including return of said carrier to its home position when said Carrier Return key is depressed;

recording apparatus interconnected with said printer, said recording apparatus having facilities for recording characters in and reading from a revisable record media;

means in said recording apparatus responsive to signals from said transmitting means to record coded characters in said record media;

a circuit in said recording apparatus for encoding a Feed code for recording in said record media;

means in said recording apparatus automatically operative upon each depression of said Carrier Return key to record a Carrier Return character and to render said encoding circuit effective to record a redundant Feed code in said record media;

means in said recording apparatus for reading previously recorded data signals;

start condition control means for selecting a particular type of said data units for reading;

means for starting a reading operation;

and means in said recording apparatus controlled by said start condition control means and responsive to the recognition of the distinctive identifier character associated with a selected type of data unit for stopping the reading operation.

19. The apparatus of claim 18 which further comprises:

a Revise Carrier Return key on said printer;

and means operative upon depression of said Revise Carrier Return key for inhibiting the action of said Feed code encoding circuit that normally takes place when said Carrier Return key is depressed.

20. Data recording apparatus, comprising:

a printer, said printer supplying and responding to data signals representative of characters of information and functional characters;

magnetic recording apparatus interconnected with said printer, said magnetic recording apparatus having facilities for recording coded characters in a magnetic revisable record media in response to data signals supplied by said printer and for reading coded characters and concurrently supplying data signals to said printer;

encoding means in said magnetic recording apparatus for generating signals representative of coded characters;

and means in said magnetic recording apparatus automatically operative upon recognition of particular data signals supplied by said printer to record a predetermined related coded character, and to concurrently render said encoding means effective to supply signals for recording a redundant character in said record media so that space is established in said record media beyond that normally required for said predetermined character to allow for expansion of recorded information during subsequent revision of said record media.

21. Data processing apparatus, comprising:

a data reading apparatus, said reading apparatus having facilities for reading data signals in a record media representative of characters of information categorized into a number of types of data units respectively designated according to size from largest to smallest as blocks, lines, words, and characters of information, each of said data units including a distinctive identifier character and each larger data unit comprising data units of the next smaller size;

start condition control means having a plurality of settings corresponding to said data unit types for selecting a particular type of data unit;

means for starting a reading operation in order to derive data representing signals grouped according to the order determined by said selecting means;

and means in said reading apparatus controlled by said start condition control means and responsive to the recognition of the distinctive identifier character associated with the currently selected type of data unit for stopping the reading operation.

22. Data processing apparatus, comprising:

a data reading apparatus, said reading apparatus having facilities for reading data signals in a record media categorized into a number of data unit types respectively designated according to size from largest to smallest, each of said data units including a distinctive identifier character, and each larger data unit comprising data units of the next smaller size;

start condition control means having individual settings corresponding to said data unit types for selecting a particular type of data unit for reading;

means for starting a reading operation;

and means in said reading apparatus controlled by said start condition control means and responsive to the recognition of the distinctive identifier character associated with a selected type of data unit for stopping the reading operation.

23. Data processing and printing apparatus, comprising:

a reading apparatus, said reading apparatus having facilities for reading data signals in a record media representative of progressively different units respectively designated according to size from largest to smallest as blocks, lines, words and characters of information, said units being identified by reference codes, line return codes, space codes, and the characters themselves, respectively, and each larger data unit comprising data units of the next smaller size;

condition control means having individual settings corresponding to said data unit types for selecting a particular type of data unit for reading;

means for starting a reading operation;

and means in said reading apparatus controlled by said condition control means and responsive to the recognition of the identifier code associated with a selected type of data unit for stopping the reading operation.

References Cited by the Examiner

UNITED STATES PATENTS

| | | | |
|---|---|---|---|
| 2,439,497 | 4/1948 | Tholstrup | 197—20 |
| 2,540,029 | 1/1951 | Hamilton et al. | 197—20 |
| 2,700,447 | 1/1955 | Blodgett | 197—20 |
| 2,860,756 | 11/1958 | Wilson et al. | 197—19 |
| 2,905,298 | 9/1959 | Blodgett et al. | 197—20 |
| 2,905,299 | 9/1959 | Hildebrandt | 197—20 |
| 2,919,002 | 12/1959 | Palmer | 197—16 |
| 3,025,941 | 3/1962 | Blodgett et al. | 197—20 |
| 3,115,620 | 12/1963 | Cooper et al. | |

ROBERT E. PULFREY, *Primary Examiner.*

EDGAR S. BURR, *Assistant Examiner.*

Disclaimer 3,260,340.—*Henry C. Locklar* and *Donald E. Sims*, Lexington, Ky. REVISION SYSTEM FOR DATA RECORDING AND PRINTING APPARATUS. Patent dated July 12, 1966. Disclaimer filed Mar. 12, 1969, by the assignee, *International Business Machines Corporation.*

Hereby enters this disclaimer to claims 11 and 22 of said patent.

[*Official Gazette July 8, 1969.*]